United States Patent
Schiewer et al.

(10) Patent No.: US 11,826,779 B2
(45) Date of Patent: Nov. 28, 2023

(54) MULTILAYER ARTICLES VIA WET-ON-WET PROCESSING

(71) Applicant: 3M INNOVATIVE PROPERTIES COMPANY, St. Paul, MN (US)

(72) Inventors: Brittni M. Schiewer, St. Paul, MN (US); Eric A. Vandre, Roseville, MN (US); Chris A. Pommer, Woodbury, MN (US); Kara A. Meyers, Oakdale, MN (US); Anish Kurian, Woodbury, MN (US); Michelle Ji, Woodbury, MN (US); Hyacinth L Lechuga, St. Paul, MN (US); Ross E. Behling, Woodbury, MN (US); Dong-Wei Zhu, North Oaks, MN (US); Robert B. Secor, Stillwater, MN (US); Mikhail L. Pekurovsky, Bloomington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/758,167

(22) PCT Filed: Dec. 24, 2020

(86) PCT No.: PCT/IB2020/062455
§ 371 (c)(1),
(2) Date: Jun. 29, 2022

(87) PCT Pub. No.: WO2021/137123
PCT Pub. Date: Jul. 8, 2021

(65) Prior Publication Data
US 2023/0057006 A1    Feb. 23, 2023

Related U.S. Application Data

(60) Provisional application No. 62/955,568, filed on Dec. 31, 2019.

(51) Int. Cl.
  *B05D 3/12*   (2006.01)
  *B05D 7/00*   (2006.01)
  *C08J 7/04*   (2020.01)

(52) U.S. Cl.
  CPC ............. *B05D 7/582* (2013.01); *C08J 7/042* (2013.01); *C08J 2300/00* (2013.01)

(58) Field of Classification Search
  None
  See application file for complete search history.

(56) References Cited

U.S. PATENT DOCUMENTS

| 4,907,530 A | 3/1990 | Shibata et al. |
| 5,296,277 A | 3/1994 | Wilson et al. |

(Continued)

FOREIGN PATENT DOCUMENTS

| WO | 2000002966 A1 | 1/2000 |
| WO | 2001029144 A1 | 4/2001 |

(Continued)

OTHER PUBLICATIONS

International Search Report for PCT International Application No. PCT/IB2020/062455, dated Mar. 12, 2021, 4 pages.

(Continued)

*Primary Examiner* — Dah-Wei D. Yuan
*Assistant Examiner* — Kristen A Dagenais
(74) *Attorney, Agent, or Firm* — Thomas M. Spielbauer

(57) ABSTRACT

Wet-on-wet coating processes are provided to produce multilayer articles. First and second coating materials are sequentially applied on to a structured substrate surface to form a skin layer directly over the structured substrate surface and a bulk layer over the skin layer. The conformability of the skin layer can be adjusted to provide desired surface and bulk properties.

13 Claims, 13 Drawing Sheets

(56) References Cited

U.S. PATENT DOCUMENTS

| | | | |
|---|---|---|---|
| 5,397,600 A | 3/1995 | Shibata et al. | |
| 5,527,578 A | 6/1996 | Mazurek et al. | |
| 5,569,494 A | 10/1996 | Suzuki et al. | |
| 5,858,545 A | 1/1999 | Everaerts et al. | |
| 6,007,914 A | 12/1999 | Joseph et al. | |
| 6,033,723 A | 3/2000 | Kistler et al. | |
| 6,123,890 A | 9/2000 | Mazurek et al. | |
| 6,153,265 A | 11/2000 | Tomaru et al. | |
| 6,197,397 B1 | 3/2001 | Sher et al. | |
| 6,251,484 B1 | 6/2001 | Suzuki et al. | |
| 6,416,858 B1 | 7/2002 | Ercillo et al. | |
| 6,503,620 B1 | 1/2003 | Xie et al. | |
| 6,783,349 B2 * | 8/2004 | Neavin | B29C 48/21 425/133.5 |
| 6,824,818 B2 | 11/2004 | McCoy et al. | |
| 6,838,142 B2 | 1/2005 | Yang et al. | |
| 6,838,150 B2 | 1/2005 | Mazurek et al. | |
| 7,846,504 B2 | 12/2010 | Maier et al. | |
| 9,102,774 B2 | 8/2015 | Clapper et al. | |
| 9,174,237 B2 | 11/2015 | Sherman | |
| 9,333,533 B2 * | 5/2016 | Dudley | B05D 1/40 |
| 9,914,854 B2 * | 3/2018 | Traser | B05D 1/42 |
| 2003/0129343 A1 | 7/2003 | Galkiewicz et al. | |
| 2015/0337185 A1 | 11/2015 | Sherman et al. | |
| 2016/0096980 A1 | 4/2016 | Wieneke et al. | |
| 2017/0362469 A1 | 12/2017 | Sherman et al. | |

FOREIGN PATENT DOCUMENTS

| | | | |
|---|---|---|---|
| WO | 2012027377 A2 | 3/2012 | |
| WO | 2012071303 A2 | 5/2012 | |
| WO | 2014130507 A1 | 8/2014 | |
| WO | 2016106040 A1 | 6/2016 | |
| WO | WO-2017058499 A1 * | 4/2017 | C08F 220/18 |
| WO | 2019123180 A1 | 6/2019 | |
| WO | 2019123181 A1 | 6/2019 | |
| WO | 2019193468 A1 | 10/2019 | |
| WO | 2019193501 A1 | 10/2019 | |

OTHER PUBLICATIONS

Kistler, "Spin Coating Over Uneven Substrates", Spin Coating, Chapter 14.3, 1997, pp. 721-732.

Pietarinen, "Improvement of UV-Moulding Accuracy By Heat And Solvent Assisted Process", Microelectronic Engineering, 2008, vol. 85, pp. 263-270.

* cited by examiner

MULTILAYER ARTICLES VIA WET-ON-WET PROCESSING

CROSS REFERENCE TO RELATED APPLICATIONS

This application is a national stage filing under 35 U.S.C. 371 of PCT/IB2020/062455, filed 24 Dec. 2020, which claims the benefit of U.S. Application No. 62/955,568, filed 31 Dec. 2019, the disclosure of which is incorporated by reference in its/their entirety herein.

BACKGROUND

Applicators are widely used in multilayer coating processes to deliver a wide range of fluids onto a continuous web to form multilayer coated articles. The fluids can be coated using a single layer coating process such that the fluids are coated in series with each layer being dried, cured, etc. before the next one is applied.

SUMMARY

Briefly, in one aspect, the present disclosure describes a method. The method includes conveying, along a web path, a substrate from a first coating applicator to a second coating applicator, the substrate comprising a structured surface including a pattern of structured features; applying a first coating fluid from the first coating applicator on to the structured surface of the substrate to form a skin layer directly over the pattern of structured features; applying a second coating fluid from the second coating applicator on to the skin layer to form a second coating layer directly over the first coating layer, the second coating fluid being different from the first coating fluid; and solidifying the first and second coating layers to form a dual-layer coating comprising a skin layer and a bulk layer. A residence time between applying the first coating fluid and applying the second coating fluid is controlled to adjust the conformability of the skin layer on the structured surface.

In another aspect, the present disclosure describes a multilayer coated article. The article includes a substrate comprising a first major surface and a second opposing major surface, the first major surface comprising a micro-structured surface comprising a pattern of structured features including one or more rising walls each extending from a raised end to a lower end opposite the raised end, each rising wall connecting a raised surface at the raised end and a corner at the lower end; and a dual-layer coating disposed on the first major micro-structured surface of the substrate. The dual-layer coating includes a skin layer directly disposed on the micro-structured surface of the substrate. The skin layer has a thickness on the corners greater than on the raised surfaces. A bulk layer is directly disposed upon the skin layer.

Various advantages are obtained in exemplary embodiments of the disclosure. One such advantage of exemplary embodiments of the present disclosure is that the conformability of the skin coating layer on the structured surface can be controlled by a residence time and/or other environmental factors. Accordingly, the obtained dual-layer coating can exhibit different surface and bulk coating properties for desired applications.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 2E is a cross-sectional view of a multilayer coated article by solidifying the article of

FIG. 2D.

DETAILED DESCRIPTION

Figure 1:
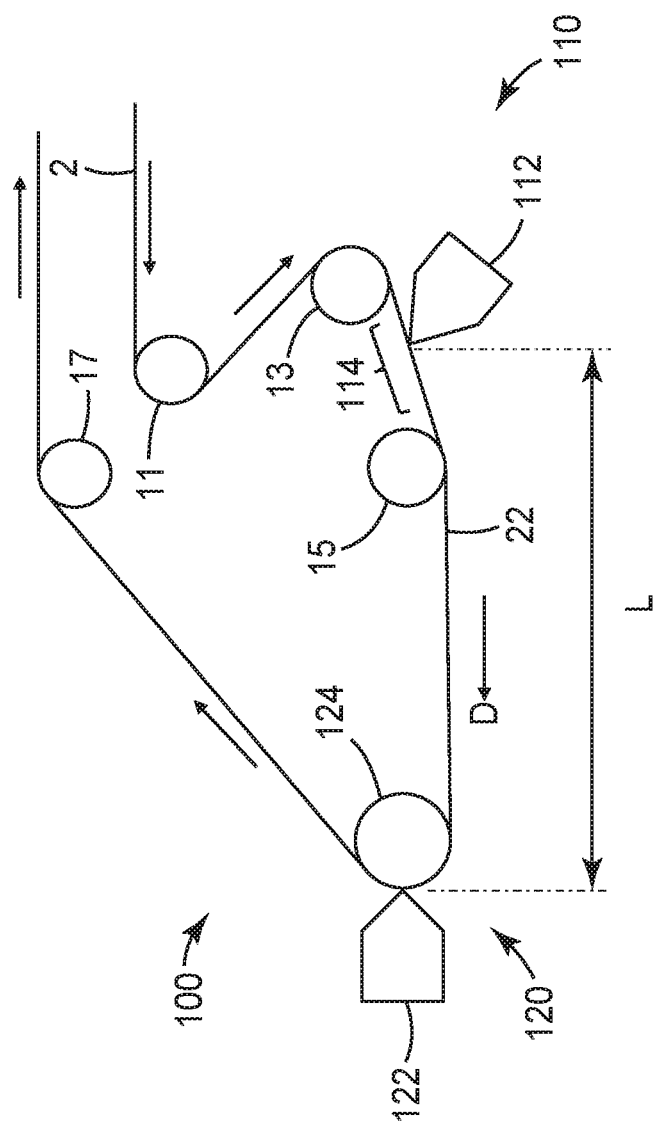
FIG. 1 is a schematic view of a coating apparatus, according to an exemplary of the present disclosure.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

The term "coating fluid" refers to a fluid having a combination of interfacial properties and viscosity so that it will not de-wet from the web surface after being spread over the surface during transport through a coating station. Examples of coating fluids coatable by this disclosure are monomers, oligomers, solutions of dissolved solids, solid-fluid dispersions, fluid mixtures, and emulsions. Such fluids are useful in producing a wide range of functional coatings on webs including release coatings, low adhesion coatings, priming layers, adhesive coatings responsive to electromagnetic radiation or electric or magnetic fields, protective coatings, optically active coatings, and chemically active coatings. Exemplary coating fluids are described further in U.S. Pat. No. 5,527,578 (Mazurek et al.), U.S. Pat. No. 5,858,545 (Everaerts et al.), U.S. Pat. No. 6,007,914 (Joseph et al.), and PCT Publication No. WO 00/02966 (Kesti et al.), which are all incorporated herein by reference.

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term "overcoated" to describe the position of a layer with respect to a substrate or other element of an article of the present disclosure, we refer to the layer as being atop the substrate or other element, but not necessarily contiguous to either the substrate or the other element.

The terms "about" or "approximately" with reference to a numerical value or a shape means +/− five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

In the present disclosure, wet-on-wet coating processes are provided to produce multilayer coatings. First and second coating fluids are sequentially applied on to a structured substrate surface to form a first coating layer directly over the structured substrate surface and a second coating layer over the first coating layer. The conformability of the first coating layer can be adjusted to provide desired surface and bulk coating properties. In addition to coating functionality, the wet-on-wet coating processes described herein can also be used to improve upon coating limitations often encountered in single layer die coating methods and dry lamination methods for multilayer coating constructions.

Referring now to FIG. 1, a schematic view of a coating apparatus 100 is illustrated to perform methods of the present disclosure, according to some embodiments. The coating apparatus 100 includes a web path to convey a web 2 from a first coating applicator 110 to a second coating applicator 120. A first coating fluid is applied from the first coating applicator 110 on to the structured surface 22 of the web 2 to form a skin layer directly over the pattern of structured features on the web 2. A second coating fluid is applied from the second coating applicator 120 on to the skin layer to form a bulk layer directly over the skin layer. The second coating fluid is different from the first coating fluid. For example, the second coating fluid may have a different composition, different chemical phases, or material properties that may be used to distinguish the solidified bulk layer from the solidified skin layer. The web path can include various rolls 11, 13, 15, 17 and/or other mechanisms to convey the web 2 at a predetermined line speed along a machine direction D. In some embodiments it is preferable to choose suitable web conveying mechanisms that do not contact the structured surface 22 of the web 2 in the web path between first coating applicator 110 to the second coating applicator 120.

In the depicted embodiment of FIG. 1, the first coating applicator 110 includes a slot die 112 engaging with the web 2 in the free span path 114 between supporting rollers 13 and 15. The slot die 112 includes one or more die openings or channels through which the first coating fluid can flow towards the structure surface 22 of the web 2, where the one or more channels are arranged in the machine direction or in the cross-web direction. The die coating processes for applying the first coating fluid can be referred to as pre-metered coating processes. For example, the first coating applicator 110 can include a pump and a control system for the pump. The pump can provide a predetermined flow rate of the first coating fluid. The predetermined flow rate, along with other factors such as, for example, the web speed, can largely define the wet coating thickness of the skin layer. The pump can be, for example, a high bandwidth precision pump that is in fluid communication with an input port of the die body.

It is to be understood that the first coating applicator 110 can be any suitable applicator for coating a thin fluid layer on to the web surface. Suitable first coating applicator may include, for example, a fluid bearing die coating applicator, a gravure coating applicator, a Mayer rod coating applicator, a rod coating applicator, a slot die coating applicator, a curtain coating applicator, a slide coating applicator, a notch bar coating applicator, a knife coating applicator, a blade coating applicator, a squeegee coating applicator, a dip coating applicator, or a roll coating applicator. Exemplary applicators are described in, for example, "Liquid Film Coating", Editors Kistler S F and Schweizer P M. Springer, Dordrecht 1997, pp. 401-462, 539-571, 637-672, and 735-768.

In the depicted embodiment of FIG. 1, the second coating applicator 120 includes a slot die 122 engaging with a back-up roll 124. The slot die 122 includes one or more die openings or channels through which the second coating fluid can flow towards the back-up roll 124, where the one or more channels are arranged in the machine direction or in the cross-web direction. The die coating processes for applying the second coating fluid can be referred to as pre-metered coating processes. For example, the second coating applicator 120 can include a pump and a control system for the pump. The pump can provide a predetermined flow rate of the second coating fluid. The predetermined flow rate, along with other factors such as, for example, the web speed, can largely define the thickness of the second coating layer. The pump can be, for example, a high bandwidth precision pump that is in fluid communication with an input port of the die body.

It is to be understood that various configurations of slot die can be applied herein.

Exemplary slot dies are described in, e.g., U.S. Pat. No. 7,846,504 (Maier et al.). It is also to be understood that the second coating applicator 120 can be any suitable applicator for coating the second coating fluid on the web surface 22 which has been covered by the skin layer of the first coating fluid. Suitable second coating applicator may include, for example, a slot die coating applicator, a slide coating applicator, a curtain coating applicator, a roll coating applicator, a gravure coating applicator, or a notch bar coating applicator.

In the depicted embodiment of FIG. 1, the first coating applicator 110 and the second coating applicator 120 are separated by a distance L as measured by the web length along the machine direction between the respective coating zones of the first coating applicator 110 and the second coating applicator 120. In other words, after the first coating fluid is applied from the first coating applicator 110 on to the web surface 22 to form a skin layer, the web 2 is conveyed along the web path for the distance L to arrive at the coating zone of the second coating applicator 120, where the second coating fluid is applied on to the skin layer to form a bulk layer.

The web is conveyed along this web path between the first coating applicator 110 and the second coating applicator 120 at a certain speed, known as the line speed or coating speed. The time it takes the web to travel from the coating zone of the first coating applicator 110 to the coating zone of the second coating applicator 120 refers to a residence time T between the first and second coatings. This residence time T can be calculated by dividing the distance of the web path L by the line speed. The residence time T may be determined by considering a broad range of coating factors including, for example, web speed, physical constraints for coating applicators, and drying rates of different formulations within thickness limitations. In some embodiments, the distance L may be in the range, for example, from 0.01 m to 20 m, from 0.1 m to 20 m, from 0.1 m to 10 m, or from 0.2 m to 5 m. In some embodiments, the residence time T between the first and second coatings may be in the range, for example, from 0.001 seconds to 200 seconds, from 0.01 seconds to 200 seconds, from 0.01 seconds to 100 seconds, or from 0.1 seconds to 30 seconds.

In some embodiments, the first coating applicator 110 and the second coating applicator 120 can be mounted on separate coating stations. In some embodiments, the first coating applicator 110 and the second coating applicator 120 can be mounted in a single coating station. The distance between the first coating applicator 110 and the second coating applicator 120 can be adjustable by any suitable mechanisms.

Referring again to FIG. 1, after the second coating fluid is applied from the second coating applicator 120 on to the skin layer to form a bulk layer directly over the skin layer, the fluid coatings on the web surface 22 are solidified to form a dry dual-layer coating including a skin layer and a bulk layer corresponding to the first coating fluid and the second coating fluid, respectively. In some embodiments, the fluid coatings can be solidified by a curing process, which may refer to chemically crosslinking, such as by exposing to radiation in any form, heating, or allowing to undergo a chemical reaction that results in hardening of a material or an increase in viscosity (e.g., under ambient temperature or heated conditions). Suitable curing conditions are well known in the art and include by way of example, heating, irradiating with visible or ultraviolet (UV) light, electron beams, and the like. Alternatively, "solidifying" may be caused by solvent removal during drying, for example, without polymerization or cross-linking.

Figure 12A:
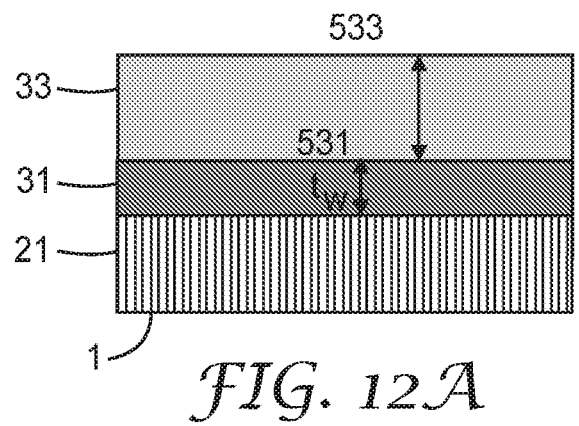
FIG. 12A is a cross-sectional view of a wet-on-wet multilayer coating on a planar web substrate.
Figure 12B:
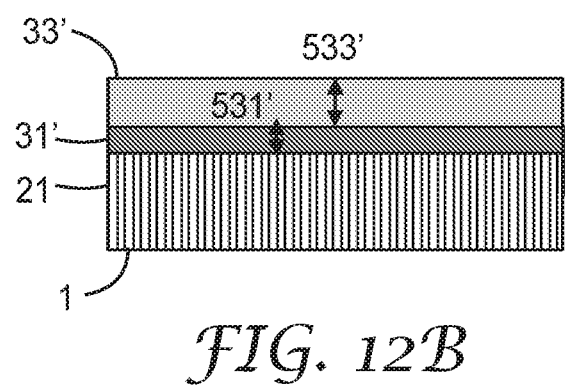
FIG. 12B is a cross-sectional view of a multilayer coating on a planar web substrate by solidifying the article of FIG. 12A In the drawings, like reference numerals indicate like elements. While the above-identified drawings, which may not be drawn to scale, set forth various embodiments of the present disclosure, other embodiments are also contemplated, as noted in the Detailed Description. In all cases, the presently disclosed disclosure is described by way of representation of exemplary embodiments and not by expressed limitations. It should be understood that numerous other

The present disclosure found that coating thickness and uniformity of the first coating layer (skin layer) and the second coating layer (bulk layer) can impact performance attributes of the dual-layer coating article. First and second coating applicators, such as the first coating applicator 110 and the second coating applicator 120 shown in FIG. 1, can control the wet coating thickness applied to web surface 22. The dry thicknesses of the skin layer and the bulk layer result after removing solvent or volatile species during the solidification step. Although the article of interest in this disclosure has a micro-structure web surface 22, it is convenient to refer to the theoretical wet thickness assuming the web surface is planar, as illustrated in FIG. 12A. In this idealization, the wet-on-wet coating method is applied to a web 1 with planar web surface 21 with the first coating fluid 31 having a wet thickness 531 with value $t_w$. The second coating fluid 33 forms a layer of wet thickness 533 on top of the wet first coating fluid. Since the coating may shrink during the solidification step (due to evolution of solvents, monomers, or other species), dry thickness may be significantly less than the wet thickness for each layer. Considering again the idealized web 1 with planar surface 21 for convenience, FIG. 12B shows skin layer 31' with dry thickness 531' and bulk layer 33' with dry thickness 533' that may result from solidification of the wet coating state illustrated in FIG. 12A.

Before the solidification, the ratio of the skin layer average wet thickness and the bulk layer average wet thickness is in a range, for example, from about 0.01 to about 1.0, from about 0.03 to about 0.5, or from about 0.05 to about 0.2. It is to be understood that in some embodiments, the skin layer may have a local wet thickness greater than that of the bulk layer. In some embodiments, the skin layer may have average wet thickness greater than the bulk layer average wet thickness. The dual-layer coating may have a dry thickness in the range, for example, from about 10 micrometers to about 250 micrometers, or from about 12 micrometers to about 75 micrometers.

The first coating fluid for forming the skin layer or "wetting layer" on the web surface 22 may include one or more adhesives such as pressure sensitive adhesive (PSA) and optional additional components depending on the desired properties of the skin layer. One exemplary pressure sensitive adhesive (PSA) of the skin lay may include a copolymer prepared from polymerizing iso-octyl acrylate, acrylamide, and silicon-containing monomer.

In some embodiments, the first coating fluid may include monomers dissolved in an inert organic solvent and polymerized using a suitable free radical initiator which may be thermally or photochemically activated. Forming a skin layer from the first coating fluid may include evaporation of solvent from the first coating fluid after it is coated on the web surface 22.

The properties of the skin adhesive layer may be designed so that it releases easily from the web surface 22, facilitating separation of the skin layer from the web surface 22 with little or no damage to the bulk layer. The properties of the skin layer may also be designed so that an article (e.g. adhesive graphic) with a backing adhered to the bulk layer is temporarily repositionable. The skin coating layer can be designed to impart temporary repositionability to the article with little or no change in bulk adhesive properties of the bulk layer. This may be evidenced by low initial peel adhesion (bond strength) of the article to the object, followed by increasing peel adhesion over time. For example, it may be useful for an article to exhibit an initial peel adhesion that is lower by about 20% or more relative to an article without the skin layer. The skin layer can also be designed to keep the bulk layer from sticking to itself once the substrate is removed.

In some embodiments, the second coating fluid may include pressure sensitive adhesive (PSA) and optional additional components depending on the desired properties of the coating formed. Forming a coating layer or film from the second coating fluid may include evaporation of solvent from the second coating fluid after it is coated, or it may include cooling if the second coating fluid includes a hot melt pressure sensitive adhesive (PSA). Forming a film from the second coating fluid may also include curing components in the fluid, such as by applying thermal, UV or other source of radiant energy to initiate a reaction between a crosslinking agent and a polymer or oligomer component. A combination of any of these may also be used.

The properties of the film, or bulk layer, may be designed so that it builds to a predetermined minimum peel adhesion with a particular object. For example, an application may require that the bulk layer not be removable from an object after a period of time or only removable under severe conditions such as high heat or solvent that dissolves the layer. Such an article may include a paint replacement film for automobiles. Alternatively, an application may require that the film be removable after a short period of time such as for a paint masking tape on a window, or after a longer period of time such as for a protective film on a display device.

A variety of additional components may be included in the first or second coating fluid to achieve the desired properties of the respective skin layer or bulk layer. For example, tackifying resins and plasticizers may be used in order to adjust the tack properties of the skin or bulk layer. Tackifying resins may include rosins and resins of polyterpenes, phenolics, and coumarone-indenes and may be used in an amount of up to about 150 parts by weight, based on 100 parts by weight of the silicon-containing pressure sensitive adhesive (PSA).

Plasticizers may include aromatic, paraffinic, and naphthenic extender oils, and may be used in an amount of up to about 50 parts by weight, based on 100 parts by weight of the silicon-containing pressure sensitive adhesive (PSA). Pigments, fillers, glass beads, stabilizers, cross-linkers, etc. may also be added.

The second coating fluid for forming the bulk layer is different from the first coating fluid for forming the skin layer. In some embodiments, the second coating fluid may have a higher viscosity than the first coating fluid. For example, the first coating fluid may have a viscosity in the range from about 0.5 cP to about 300 cP at a shear rate of 100 1/s, optionally from about 5 cP to about 100 cP at a shear rate of 100 1/s. The viscosity ratio a shear rate of 100 1/s between the first and second coating fluid is in the range, for example, from about 0.0001 to about 1, optionally from about 0.001 to about 0.5.

In the present disclosure, the first coating fluid (skin layer) includes a solvent component such as, for example, organic solvent, water, monomer, etc. In some embodiments, the first and second coating fluids may contain respective polymers that are soluble in the same solvent such as, for example, ethyl acetate. With both polymer systems being soluble in the same solvent, undesired macroscale phase separation in some embodiments may be avoided. The present disclosure observed that when the first coating fluid for a skin layer includes a solvent that is immiscible with that of the second coating fluid for the bulk polymer, macroscale phase separation may occur.

In some embodiments, the bulk layer formed by solidifying the second coating fluid may exhibit a lower Glass Transition Temperature (Tg) than the skin layer formed by solidifying the first coating fluid. In some embodiments, the bulk layer may have an average thickness of at least 10 micrometers; and include an acrylate pressure-sensitive adhesive having a Fox Tg of up to −30° C. The skin layer may have an average thickness of up to 25 micrometers. The ratio of the bulk layer average thickness to the skin layer average thickness is at least 2:1. The skin layer may include an adhesive having a Fox Tg of −20° C. to +50° C. PCT Publication No. WO 2019/123180 describes a bilayer adhesive with high Tg at the adhesive surface, which is incorporated by reference.

The major surface 22 of the web 2 on to which the first coating fluid is coated may have a textured or structured surface. Exemplary webs having textured, or structured surfaces can be release liners. The textured or structured surface imparts a shape to the one or more coating layers thereon. One useful shape can be two or more planar surfaces separated by at least one groove or channel as shown in FIGS. 2A-2E. Textured surfaces include those having random roughness, random patterns of shapes, ordered roughness, ordered patterns of shapes, or combinations thereof. Structured surfaces include micro-structured surfaces such as those provided by micro-structured release liners. Micro-structured surfaces generally include a micro-structure having at least two lateral dimensions (i.e. dimensions in the plane of the film) less than 1.4 mm (55 mils), made as described, for example, in U.S. Pat. No. 6,197,397 (Sher et al.), U.S. Pat. No. 6,123,890 (Mazurek et al.), U.S. Pat. No. 6,838,142 B2 (Yang et al.), U.S. Pat. No. 6,838,150 B2 (Mazurek et al.), etc. The micro-structured surface can include a pattern of structured features having a feature height in the range, for example, from about 100 nm to about 1 mm. The micro-structured surface may include, for example, a series of shapes including ridges, posts, pyramids, hemispheres and cones, and/or they may be protrusions or depressions having flat, pointed, truncated, or rounded parts, any of which may have angled or perpendicular sides relative to the plane of the surface. The micro-structured surface may have a pattern such as linear channels or intersecting channels forming a grid, be random, or a combination thereof. The micro-structured surface may impart substantially continuous open pathways or grooves into the first and/or second coating layers.

Figure 11:
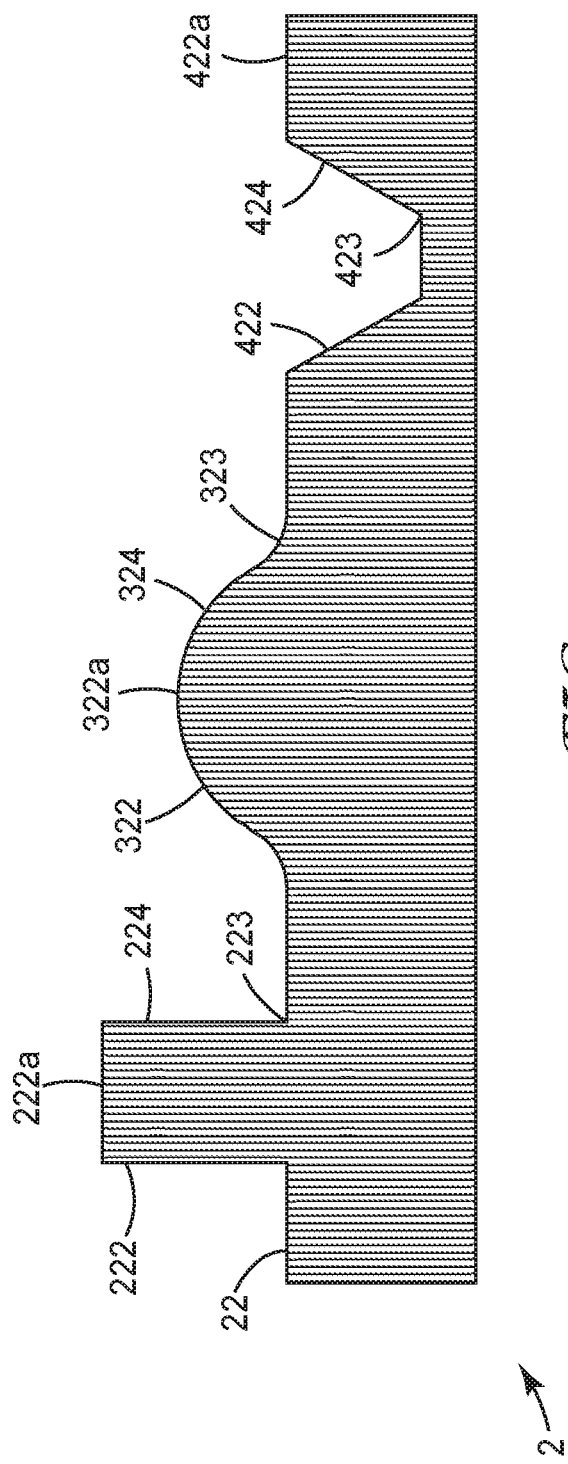
FIG. 11 is a cross-sectional view of a micro-structured web surface.

For the purpose of this disclosure, a structure on a micro-structured web surface can be characterized by a raised surface supported by a wall that transitions to a corner toward the base of the structure. As shown in FIG. 11, the structured surface 22 of the web 2 may include one or more raised features 222 characterized by a raised surface 222a supported by a rising wall 224 that is substantially vertical. The rising wall 224 extends from a raised end to a lower end and transitions from the raised surface 222a at the raised end to a sharp corner 223 at the lower end adjacent to the base of raised feature 222. The structured surface 22 may also include one or more curved raised features 322 with a raised surface 322a along a rising wall 324 of gradually changing slope with a smooth corner 323 at the base of the feature. The rising wall 324 extends from a raised end to a lower end and transitions from the raised surface 322a at the raised end to the corner 323 at the lower end. Additionally, the structured surface 22 may include one or more depressed features 422 with a raised surface 422a adjacent to a rising wall 424 that transitions to a corner 423 toward the base of the structure. The rising wall 424 extends from a raised end to a lower end and transitions from the raised surface 422a at the raised end to the corner 423 at the lower end. Complex structured surfaces may have compounded features that combine and expand upon the geometric descriptions provided here.

Referring again to FIG. 1, the first coating fluid and the second coating fluid are sequentially applied on to the structured surface 22 of the web 2 to respectively form the skin layer and the bulk layer directly over the skin layer. In the present disclosure, a residence time between applying the first coating fluid and applying the second coating fluid can be controlled to adjust the conformability of the skin layer on a structured web surface. This is further illustrated in FIGS. 2A-2E.

Figure 2A:
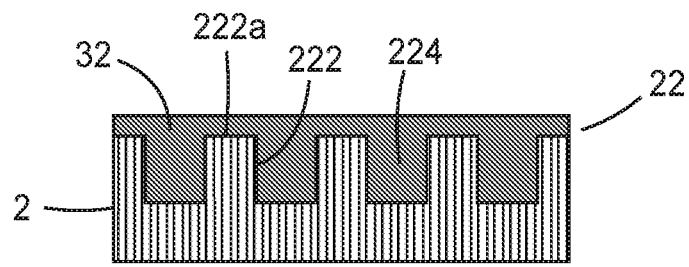
FIG. 2A is a cross-sectional view of a wet skin layer coated on a micro-structured web surface, according to one embodiment.

As shown in FIG. 2A, a first coating fluid 32 is applied, via a first coating applicator (e.g., the first coating applicator 110 of FIG. 1), on to the structured surface 22 of the web 2 to form a skin layer of first coating fluid 32. The first coating fluid may have relatively lower viscosity and lower surface tension as compared to the second coating fluid such that the first coating fluid can "wet out" the structured surface 22 of the web 2. For a single layer of fluid being coated onto a substrate, proper wetting of the fluid on the substrate occurs if the surface tension of the fluid is lower than the surface energy of the substrate. If this is not the case, then forces exerted along the surface of the fluid would likely cause it to "bead up" and form into drops. The structured surface 22 includes a pattern of structured features which can further help the first coating fluid 32 to wet out the structured surface 22. The pattern of structured features includes one or more raised features 222 separated by the grooves 224. The structured features on the structured surface 22 may have an average characteristic height/depth, for example, from about 0.1 micrometer to 1000 micrometers, from about 1 to about 200 micrometers, from about 2 to about 100 micrometers, or from about 10 to about 50 micrometers. The first coating fluid 32 may have a wet thickness enough to fill the grooves 224 and cover the raised features 222, or may have a wet thickness less than the thickness required to fill the grooves 224 and cover the raised features 222 but applied in such a way that it conformally covers both the grooves 224 and raised features 222.

Figure 2B:
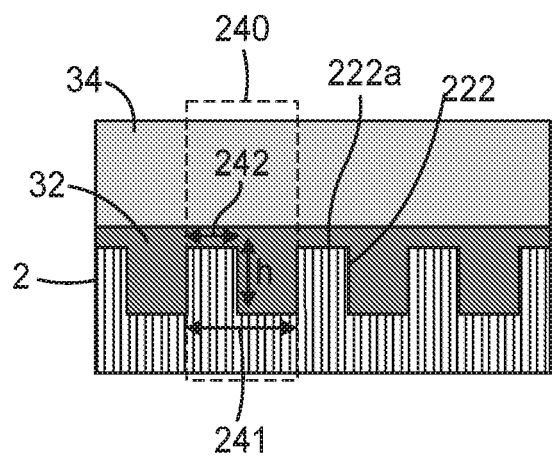
FIG. 2B is a cross-sectional view of a wet-on-wet multilayer coated article, according to one embodiment.
Figure 2C:
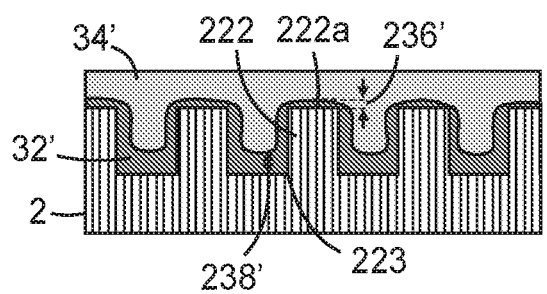
FIG. 2C is a cross-sectional view of a multilayer coated article by solidifying the article of FIG. 2B.
Figure 2D:
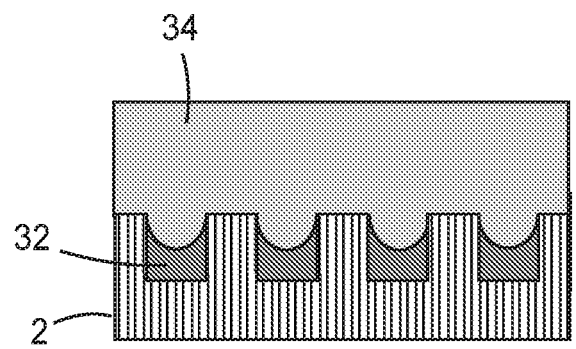
FIG. 2D is a cross-sectional view of a wet-on-wet multilayer coated article, according to another embodiment.

After the first coating fluid 32 is applied, via the first coating applicator, on to the structured surface 22 of the web 2 to form the skin layer of first coating fluid 32, the web 2 is conveyed from the first coating applicator to a second coating applicator (e.g., the second coating applicator 120 of FIG. 1), where a second coating fluid 34 is applied, via the second coating applicator, on to the skin layer 32 on the structured surface 22 of the web 2, as shown in FIGS. 2B and 2D. The fluid coating on the web 2 is then solidified to form a dual-layer coating, as shown in FIGS. 2C and 2E.

During the transportation of the web 2 from the first coating applicator to the second applicator, the skin layer of first coating fluid 32 on the structured surface 22 of the web 2 may begin to solidify or evaporate and the thickness of the layer may start to shrink. At the same time, the skin layer may begin to de-wet from the raised features of the structured surface 22 and build up in the corners. The residence time between applying the first coating fluid and applying the second coating fluid and one or more environmental factors can be controlled to adjust the conformability of the skin layer on a structured web surface.

At a relatively low residence time $T_1$, the skin layer can have a good conformability around the structured features, as shown in FIGS. 2B and 2C. In the embodiment depicted in FIG. 2B, when the second coating fluid 34 is applied on the skin layer of first coating fluid 32, the raised surfaces 222a of the raised features 222 of height h are still covered by the first coating fluid 32. The second coating fluid 34 and the first coating fluid 32 on top of the pattern of structured features may be described by a repeat unit 240 that repeats across web surface 22 defined by area 241 that includes a portion of a smaller area 242 characterizing the fractional area coverage of the raised feature 222. After solidification, the first coating fluid 32 forms a continuous skin layer 32' that directly covers the structured surface 22, as shown in FIG. 2C. The skin layer 32' has a dry thickness 238' near the corners 223 of the structured features greater than a dry thickness 236' on the raised surfaces 222*a*. The continuous bulk layer 34' covers the continuous skin layer 32' which substantially conformally covers the structured surface 22.

Figure 2E:
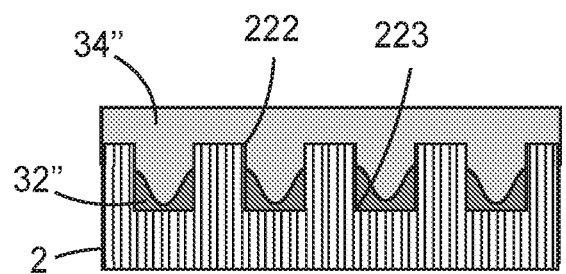

When the residence time is increased from $T_1$ to $T_2$, there is less coating on the raised features of the structured web surface and more build-up on the corners, as shown in FIGS. 2D and 2E. In the embodiment depicted in FIG. 2D, when the second coating fluid 34 is applied on the skin layer of first coating fluid 32, the first coating fluid 32 substantially de-wets the raised surfaces of the raised features 222. After solidification, the first coating fluid 32 forms a substantially discontinuous skin layer 32" that mainly resides in the grooves 224, separated by the raised features 222, as shown in FIG. 2E. On the corners 223 of the structured features, the first coating fluid 32 may accumulate and contribute an increased dry thickness to the skin layer 32". The continuous bulk layer 34" covers the skin layer 32" in the grooves 224 and the raised features 222.

In some embodiments, the resident time $T_1$ can be controlled in a range, for example, from 0.001 seconds to 30 seconds. The resident time $T_2$ can be controlled in a range, for example, from 1 second to 200 seconds.

In some embodiments, one or more environmental factors can be controlled to adjust the conformability when the substrate moves from the first coating applicator to the second coating applicator. The environmental factors may include, for example, at least one of temperature, ambient radiation, vapor pressure, etc.

In some embodiments, one or more fluid properties of the first coating liquid can be controlled to adjust the conformability when the substrate moves from the first coating applicator to the second coating applicator. The one or more fluid properties of the first coating liquid may include, for example, at least one of viscosity, surface tension, solids percentage, or volatility of solvents. In some embodiments, the conformability can be further controlled by adjusting web surface properties including, for example, surface energy, surface microstructure features (e.g., dimensions, sharp edges, etc.), sub-scale roughness, electrostatic charge, chemically reactive functionality, polarity, etc.

In some embodiments, controlling the residence time may include at least one of (i) controlling a web speed to move the substrate from the first coating applicator to the second coating applicator or (ii) controlling the distance between the first coating applicator and the second coating applicator.

After solidification, the formed dual-layer coating includes a bulk layer/skin layer configuration on a structured web surface. The dual-layer coating may have a dry thickness in the range from about 10 to about 250 micrometers, optionally, from about 12 to about 75 micrometers.

In some embodiments, a bulk layer can have an average thickness of at least 10 micrometers. In certain embodiments, a bulk layer can have an average thickness of at least 20 micrometers, at least 30 micrometers, or at least 50 micrometers and up to 150 micrometers, up to 125 micrometers, up to 100 micrometers, up to 75 micrometers, or up to 50 micrometers.

In some embodiments, the continuous/discontinuous skin layer can have an average thickness less than the feature height of the structured surface. In some embodiments, a continuous/discontinuous skin layer can have an average thickness of up to about 25 micrometers. In certain embodiments, a continuous/discontinuous skin layer can have an average thickness of up to 20 micrometers, up to 12 micrometers, up to 10 micrometers, up to 8 micrometers, up to 6 micrometers, up to 4 micrometers, or up to 2 micrometers.

In some embodiments, the ratio of the continuous/discontinuous skin layer average thickness to the bulk layer average thickness can be in a range, for example, from about 0.005 to about 0.5, from about 0.01 to about 0.3, or from about 0.01 to about 0.06. A ratio of the bulk layer average thickness to the continuous/discontinuous skin layer average thickness is at least 2:1. In certain embodiments, the ratio of the bulk layer average thickness to the continuous/discontinuous skin layer average thickness is at least 3:1, at least 4:1, at least 5:1, at least 10:1, at least 20:1, at least 50:1, or at least 70:1. In certain embodiments, the ratio of the bulk layer average thickness to the continuous/discontinuous skin layer average thickness is up to 300:1, up to 200:1, up to 100:1, or up to 50:1.

In some embodiments, the bulk layer exhibits a lower glass transition temperature than the skin layer. The relatively thin skin layer that includes the higher Tg adhesive provides an increase in the debonding force required to separate the adhesive from a substrate, in comparison to the debonding force of the lower Tg adhesive of the underlying bulk layer alone. Additionally, the lower Tg adhesive of the bulk layer provides the necessary conformability for good substrate wetting and energy dissipation that would be lacking in the higher Tg adhesive of the overlying skin layer alone. These composite properties can lead to the significant improvement in bond performance (i.e., peel force/resistance) observed for the adhesive articles of the present disclosure.

In some embodiments, the dual-layer coating may include a diffuse interface between the skin layer and the bulk layer, the diffuse interface having a thickness of, for example, about 0.1 to 10 micrometers, about 0.2 to 5 micrometers, or about 0.5 to 3 micrometers. While not wanting to be bound by theory, the inventors believe that such a diffuse interface may result from the wet-on-wet processes described herein. The polymers in the first coating fluid for the skin layer and in the second coating fluid for the bulk layer may have some degree of mobility through the depth of the coating, including the ability to interact or migrate at the interface of the two layers. The inter-diffusion of the polymers into adjacent layers may also occur during the solidification process (e.g., drying). Furthermore, blended polymer species in the diffuse interfacial region can produce smooth property gradients from one layer to the next, or complex morphology such as in the case of phase separation of polymer species. The present disclosure found that significantly more interaction and inter-diffusion may occur between a high-Tg skin layer and a low-Tg bulk layer. Cross-sectional AFM phase images in FIGS. 10A-B will provide a visual representation of the diffuse interface, which will be described further below.

Figure 3:
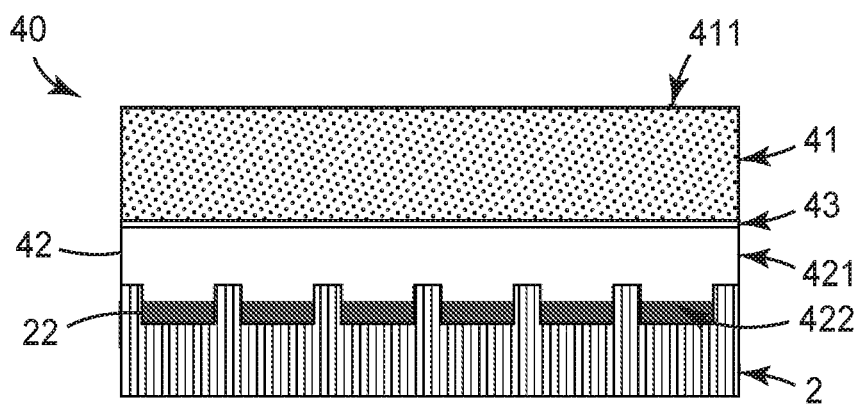
FIG. 3 is a cross-sectional view of a multilayer coated article adhered to a film.

The present disclosure provides methods to make dual-layer adhesives, where the surface properties of the adhesive can be adjusted as a highly desirable performance attribute of adhesives, particularly PSAs. The dual-layer adhesives described herein can be used for various applications. FIG. 3 illustrates one application of the adhesives to graphics films. The article 40 includes a vinyl film 41 having a printing surface 411. The vinyl film 41 is attached to a dual-layer adhesive 42 via an optional primer 43 on the side of the bulk layer 421. The skin layer 422 of the dual-layer adhesive 42 is in direct contact with the structured surface 22 of the substrate 2 (e.g., a release liner). The conformability of the skin layer 422 on the structured surface 22 and thus the surface properties of the adhesive after the removal of the release liner can be controlled according the methods described herein.

In some embodiments, the vinyl film 41 is loaded with $TiO_2$ pigment to give it a solid white color that controls the white point of the product. The primer 43 is loaded with carbon black which helps provide opacity to the product. The primer 43 also serves as the permanent bonding agent between the film 41 and the adhesive 42.

The first and second coating fluids can be particle-laden fluids loaded with various particles to provide a variety of functions. In some embodiments of graphics film applications, the first coating fluid for forming the skin layer 422 can be loaded with carbon black. The second coating fluid for forming the bulk layer 421 may be loaded with one or more pigments, optionally, the pigment includes $TiO_2$. This can improve the bulk opacity and white point of the final product by loading the bulk adhesive with pigment while independently controlling the skin layer to target adhesion and peel performance metrics.

Listing of Exemplary Embodiments

It is to be understood that any one of embodiments 1-21 and 22-29 can be combined.

Embodiment 1 is a method comprising:
moving, along a web path, a substrate from a first coating applicator to a second coating applicator, the substrate comprising a structured surface including a pattern of structured features;
applying a first coating fluid from the first coating applicator on to the structured surface of the substrate to form a first coating layer directly over the pattern of structured features;
applying a second coating fluid from the second coating applicator on to the first coating layer to form a second coating layer directly over the first coating layer, the second coating fluid being different from the first coating fluid; and
solidifying the first and second coating layers to form a dual-layer coating comprising a skin layer and a bulk layer,
wherein a residence time between applying the first coating fluid and applying the second coating fluid is controlled to adjust the conformability of the skin layer on the structured surface.

Embodiment 2 is the method of embodiment 1, further comprising controlling one or more environmental factors to adjust the conformability when the substrate moving from the first coating applicator to the second coating applicator.

Embodiment 3 is the method of embodiment 2, wherein the one or more environmental factors include at least one of temperature, ambient radiation, or vapor pressure.

Embodiment 4 is the method of any one of embodiments 1-3, further comprising controlling one or more fluid properties of the first coating liquid to adjust the conformability when the substrate moving from the first coating applicator to the second coating applicator.

Embodiment 5 is the method of embodiment 4, wherein the one or more fluid properties of the first coating liquid includes at least one of viscosity, solids percentage, or volatility of solvents.

Embodiment 6 is the method of any one of embodiments 1-5, wherein controlling the residence time comprises at least one of (i) controlling a web speed to move the substrate from the first coating applicator to the second coating applicator, or (ii) controlling the distance between the first coating applicator and the second coating applicator.

Embodiment 7 is the method of any one of embodiments 1-6, wherein the second coating fluid has a higher viscosity than the first coating fluid.

Embodiment 8 is the method of embodiment 7, wherein the first coating fluid has a viscosity in the range from about 0.5 cP to about 300 cP at a shear rate of 100 1/s, optionally from about 5 cP to about 100 cP at a shear rate of 100 1/s.

Embodiment 9 is the method of embodiment 7 or 8, wherein the viscosity ratio at a shear rate of 100 1/s between the first and second coating fluid is in the range from about 0.0001 to about 1, optionally from about 0.001 to about 0.5.

Embodiment 10 is the method of any one of embodiments 1-9, wherein the ratio of the first coating layer average wet thickness and the bulk layer average wet thickness is in a range from about 0.01 to about 1.0, optionally from about 0.05 to about 0.2.

Embodiment 11 is the method of any one of embodiments 1-10, wherein the dual-layer coating has a dry thickness in the range from about 10 to about 250 micrometers, optionally, from about 12 to about 75 micrometers.

Embodiment 12 is the method of any one of embodiments 1-11, wherein the ratio of the skin layer average dry thickness and the bulk layer average dry thickness is in a range from about 0.01 to about 0.3, optionally from about 0.01 to about 0.06.

Embodiment 13 is the method of any one of embodiments 1-12, wherein the dual-layer coating comprises a diffuse interface between the skin layer and the bulk layer, the diffuse interface having a thickness of about 0.2 to about 5.0 micrometers.

Embodiment 14 is the method of any one of embodiments 1-13, wherein the bulk layer exhibits a lower glass transition temperature than the skin layer.

Embodiment 15 is the method of any one of embodiments 1-14, wherein the structure features have a characteristic height or depth of about 2 to about 100 micrometers, optionally, about 10 to about 50 micrometers.

Embodiment 16 is the method of any one of embodiments 1-15, wherein at least one of the first and second coating fluids comprises one or more particle-laden fluids.

Embodiment 17 is the method of embodiment 16, wherein the first coating fluid further comprises carbon black.

Embodiment 18 is the method of embodiment 16 or 17, wherein the second coating fluid further comprises one or more pigments, optionally, the pigments comprise $TiO_2$.

Embodiment 19 is the method of any one of embodiments 1-18, wherein the first coating applicator comprises at least one of a fluid bearing die coating applicator, a gravure coating applicator, a rod coating applicator, a slot die coating applicator, a curtain coating applicator, a slide coating applicator, a notch bar coating applicator, a knife coating applicator, a blade coating applicator, a squeegee coating applicator, a dip coating applicator, or a roll coating applicator.

Embodiment 20 is the method of any one of embodiments 1-19, wherein the second coating applicator comprises at least one of a slot die coating applicator, a slide coating applicator, a curtain coating applicator, a roll coating applicator, a gravure coating applicator, or a notch bar coating applicator.

Embodiment 21 is the method of any one of embodiments 1-20, wherein the second coating applicator is pre-metered.

Embodiment 22 is the multilayer coated article comprising:
a substrate comprising a first major surface and a second opposing major surface, the first major surface comprising a micro-structured surface comprising a pattern of structured features including one or more rising walls each extending from a raised end to a lower end opposite the raised end, each rising wall connecting a raised surface at the raised end and a corner at the lower end; and a dual-layer coating disposed on the micro-structured surface of the substrate, wherein the dual-layer coating comprises:

a skin layer directly disposed on the micro-structured surface of the substrate, wherein the skin layer has a thickness on the corners greater than on the raised surfaces; and a bulk layer directly disposed upon the skin layer.

Embodiment 23 is the article of embodiment 22, wherein the skin layer is a continuous layer substantially covering the micro-structured surface.

Embodiment 24 is the article of embodiment 23, wherein the skin layer substantially conformally covers the micro-structured surface of the substrate.

Embodiment 25 is the article of any one of embodiments 22-24, wherein the skin layer is a discontinuous layer separated by the raised surfaces.

Embodiment 26 is the article of any one of embodiments 22-25, wherein the ratio of the skin layer average dry thickness and the bulk layer average dry thickness is in a range from about 0.01 to about 0.3, optionally from about 0.01 to about 0.06.

Embodiment 27 is the article of any one of embodiments 22-26, wherein the dual-layer coating comprises a diffuse interface between the skin layer and the bulk layer, the diffuse interface having a thickness of about 0.2 to about 5.0 micrometers.

Embodiment 28 is the article of any one of embodiments 22-27, wherein the bulk layer exhibits a lower glass transition temperature Tg than the skin layer.

Embodiment 29 is the article of any one of embodiments 22-28, wherein the dual-layer coating comprises one or more particle-laden layers.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Table 1 provides naming convention, material properties, and reference used to describe each material used in the Examples below.

All web materials used for Examples were release liners consisting of four layers with a paper core, polyethylene layer on the back side, and a micro-embossed polyethylene layer on the front side with a silicone release coating. Details of micro-structure geometry are listed in the table below for two different web materials.

TABLE 1

| Name | Reference | Micro-structure Pattern | Structure Height, h (micrometers) | Area Coverage, A |
|---|---|---|---|---|
| Web Material A | Liner from WO2019/193468 Table 1, V1ble 5, Ex. 46 | Crosshatch, intersecting | 13 | 0.17 |
| Web Material B | Liner from WO2019/193468 Table 1, V3 | Linear, parallel | 25 | 0.14 |

Coating fluids used in the Examples are described below as Formulation A, Formulation B, Formulation C, and Formulation D. Table 2 provides a brief summary material description and properties for reference. For the purpose of these descriptions, the terms "parts per hundred" or "pph" refers to the parts by weight of a component such as tackifier or cross-linking agent, based on 100 parts by weight of PSA polymer in the formulation.

Formulation A description: The stock solution was prepared by mixing (meth)acrylate ester monomer material referenced in U.S. Pat. No. 9,102,774 B2, acrylic acid, and acrylamide in ratio of 90/7/3 with 0.25% VAZO-67 initiator and ethyl acetate in a 1-liter bottle. The mixture was then divided into two bottles. The bottles were purged with nitrogen, sealed, and placed in a water bath, with agitation, at 65° C. for 24 hours. The material was further diluted from 39.8% solids to 10% solids by adding ethyl acetate.

Formulation B description: The stock solution was prepared by mixing 160 g butyl acrylate, 10 g acrylic acid, 30 g n-vinylpyrrolidone, 30 g vinyl acetate, 290 g ethyl acetate, 10 g isopropyl alcohol, and 0.5 g VAZO-67 initiator in a 1-liter bottle. The mixture was then divided into two bottles and each bottle was purged with nitrogen, sealed, and placed in a water bath, with agitation, at 65° C. for 24 hours. The material was further diluted to 10% solids by adding ethyl acetate.

Formulation C description: An acrylic pressure sensitive adhesive solution (described as Adhesive Solution 1 in U.S. Pat. No 5296,277 (Wilson et al.) and containing 0.14 parts per hundred (pph) of bisamide and 16 parts per hundred of tackifier) prepared at 38.5% solids content. The tackifier used was Terpene Phenol, available from Kraton Corporation Houston, TX as "SYLVARES" TP2019. (Reference WO2019/193501, Table 1, A1)

Formulation D description: An acrylic pressure sensitive adhesive solution (described as Adhesive Solution 1 in U.S. Pat. No 5296,277 (Wilson et al.) and containing 0.14 parts per hundred (pph) of bisamide) prepared at 35% solids content.

TABLE 2

| Name | Reference | Solvent | Polymer Composition (ratio) | Tackifier (pph) | Cross-linking Agent (pph) | Solids Content (% mass) | Viscosity (cP @ 100 1/s) |
|---|---|---|---|---|---|---|---|
| Formulation A | U.S. Pat. No. 9,102,774 B2 | ethyl acetate | acrylate ester/ acrylic acid/ acrylamide (90/7/3) | 0 | 0 | 10 | 14 |
| Formulation B | — | ethyl acetate, <1% iso-propyl alcohol | butyl acrylate/ acrylic acid/n-vinylpyrrolidone/ vinyl acetate/ (80/5/15/15) | 0 | 0 | 10 | 17 |
| Formulation C | WO2019/193501 (Table 1, A1) | ethyl acetate | isooctyl acrylate/ acrylic acid (97/3) | 16 | 0.14 | 38.5 | 1880 |
| Formulation D | WO2019/193501 (Table 1, A1) | ethyl acetate | isooctyl acrylate/ acrylic acid (97/3) | 0 | 0.14 | 35 | 2,040 |

Test Methods

The following test methods have been used in evaluating some of the Examples of the present disclosure.

Sample Preparation of Cross-sectioned Adhesive Films

Cross-sections of multilayer adhesive coatings were performed using cryo-microtomy. The micro-structured liners tended to delaminate during sample prep. These liners were therefore removed and the samples were thin-embedded in Struers Specifix epoxy (cured at room temperature overnight and then embedded films were cryo-microtomed near −60° C. using Leica EM UC6.

AFM (Atomic Force Microscopy)

Atomic Force Microscopy (AFM) in Tapping Mode was used to characterize the cross-sectioned layers. Atomic Force Microscopy (AFM) consists of a flexible cantilever with a sharp tip attached to the cantilever's free end. The sharp AFM tip can be brought into contact with the sample and scanned in a raster pattern to generate high-resolution three-dimensional images of sample surfaces. The technique is based on forces of interaction present between the tip and sample surface, which cause the cantilever to deflect as it scans across the surface. The cantilever deflection is monitored using a laser deflection technique in which a laser beam is reflected off the back of the cantilever and detected by a photodiode. A piezoelectric scanner is used to accurately control the tip's movement in the vertical and lateral directions. Topographic information is obtained by using the photodiode signal as a control parameter of a feedback mechanism. In Tapping Mode AFM, the flexible tip/cantilever assembly is oscillated near the resonant frequency of the cantilever and the two main signal outputs are topography (height) and phase images. The amplitude of vertical oscillation is the input parameter for the feedback loop for generating the topography image. The phase shift, measured as the phase difference between the photodiode output and the driving excitation signal, is monitored to generate the phase image. Phase images are useful for visualization purposes. The phase signal is generally related to a complex set of contributions from surface material properties (dissipation, elasticity, adhesion, surface topography and thus, difficult to interpret quantitatively. Darker regions in a phase image correspond to a material with lower stiffness while brighter regions correspond to a material with higher stiffness. All AFM images were obtained from a Bruker Dimension ICON AFM system. The AFM tip used is an OTESPA-R3 silicon tip with nominal spring constant of 42 N/m, resonant frequency between 200 kHz and 400 kHz, and nominal tip radius of curvature of 7 nm.

Viscosity Measurement

Coating fluids were characterized using a Discovery Hybrid Rheometer (TA Instruments) with Peltier concentric cylinder instrument geometry where a bob (28 mm diameter) rotates at a controlled rate while submersed in approximately 25 mL of the analyzed coating fluid contained within a closely fitting cup (30 mm diameter). A flow procedure was specified with instrument software (TA Instruments) to measure shear viscosity at shear rates ranging from 0.1 1/s to 1000 1/s. Temperature was maintained at 23° C. during each measurement. Viscosity values recorded at a shear rate of 100 1/s are reported for each coating fluid in Table 2.

Glass Transition Temperature (Tg)

Fox Glass Transition Temperature (Tg) is a calculated value using the Fox equation. The calculation is based on the weighted average of the individual homopolymer glass transition values. For a copolymer prepared from n different monomers, the inverse of the Tg of the copolymer is equal to the summation of the weight fraction of each component divided by the Tg of that particular component. That is, for a copolymer prepared from n components, 1/Tg of the copolymer is equal to (weight fraction of component one÷Tg of component one)+(weight fraction of component two÷Tg of component two)÷(weight fraction of component 3÷Tg of component 3)+ . . . +(weight fraction of component n÷Tg of component n).

Coating Apparatus and Processes

Dual-layer coating Examples and Comparative Examples were made on a home-made coating system having a configuration similar to the coating apparatus 100 of FIG. 1. In each Example, a first coating fluid was applied from a first coating applicator to form a skin layer on a structured surface of a web substrate. The wet-on-wet coating method involved a second coating fluid applied from the second coating applicator on to the skin layer to form a bulk layer directly over the skin layer. The web traveled from the first coating applicator to the second coating applicator during finite time, called the residence time between coatings, which impacted the dual-layer coating characteristics as described in Examples below. In these cases, residence time was controlled by varying the web speed, though the distance separating the first and second coating applicators could also be used as a suitable control mechanism.

The web coated with fluid layer(s) was conveyed into a four zone convection drying oven with a temperature profile of 120/140/180/200° F. Web speed was controlled during the drying process to achieve desired drying time within the convection oven zones. After drying, the solidified coating samples were carefully collected to allow for cross-sectional analysis with AFM.

Dry Lamination (Comparative Examples C1-C2) Versus Wet-on-Wet (Examples E1-E2) Dual-Layer Adhesives Example C1

This example describes a dual-layer adhesive constructed on micro-structured web surface using distinct coating and solidification steps for the bulk layer and skin layer adhesives. In the first step, the skin layer coating was made on a coating system having a configuration similar to the coating apparatus 100 of FIG. 1. Adhesive coating Formulation A was coated at a wet thickness of 21 micrometers onto micro-structured Web Material A at 0.13 meters per second using a slot die coating method applied to the free-span web path. The coated web was conveyed into a four zone convection drying oven with a temperature profile of 120/140/180/200° F. for approximately 19 seconds of drying time in each oven zone and then collected as a sample of solidified skin layer coating on Web Material A.

As a second step, the bulk adhesive layer was prepared by coating Formulation C using a hand-drawn notch bar applicator to deposit a wet coating thickness of approximately 100 micrometers on PET film with thickness of 50 micrometers. The coating of Formulation C was placed in a batch oven for 10 minutes at 180 F and then collected as a sample of solidified bulk layer coating on PET film.

Lastly, a 12 cm wide, 3.5 kg weighted lamination roller was applied by hand at room temperature to uniformly laminate the skin layer sample to the bulk layers sample. This dry lamination method resulted in a dual-layer adhesive construction with bulk and skin adhesive layers bound between PET film and Web Material A.

Figure 4A:
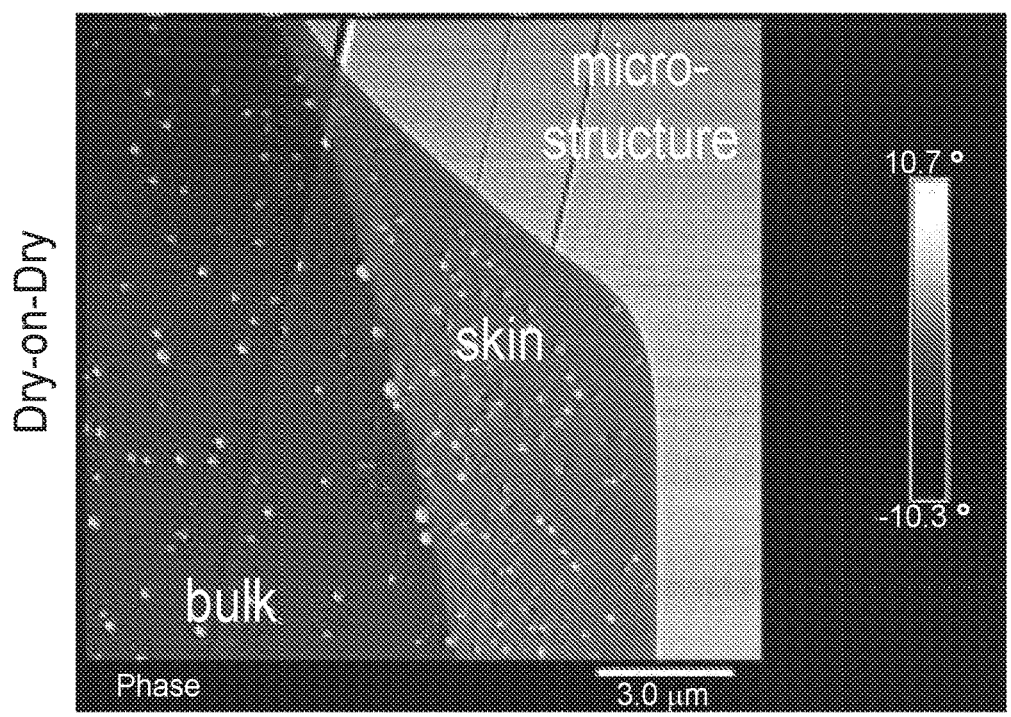
FIG. 4A is an Atomic Force Microscopy (AFM) image for Comparative Example C1.

Solidified samples were cross-sectioned and AFM analysis used (methods described in the preceding text) for coating characterization with sub-micrometers resolution of the dual-layer construction, demonstrating the sharp interface between the bulk and skin adhesive layers as shown in FIG. 4A. AFM imaging revealed accumulation of skin layer coating near the corner of the micro-structure features on Web Material A. Consequently, the solidified skin layer coating thickness varies significantly along the topography of the web micro-structure, resulting in local thickness exceeding twice the expected dry thickness (2.1 micrometers) if a coating of the same wet coating thickness and solids content had been solidified on an idealized web with planar surface.

Example C2

This example describes a dual-layer adhesive constructed on micro-structured web surface using the method in Example C1. In this case, Web Material B was used in the first coating step of the skin layer sample with coating Formulation A. As described in Example C1, the bulk layer sample was prepared in a separate hand-drawn coating step of Formulation C and then laminated to the skin layer sample. Coating rates, thickness, and drying conditions were controlled to be equivalent to Example C1.

Figure 5A:
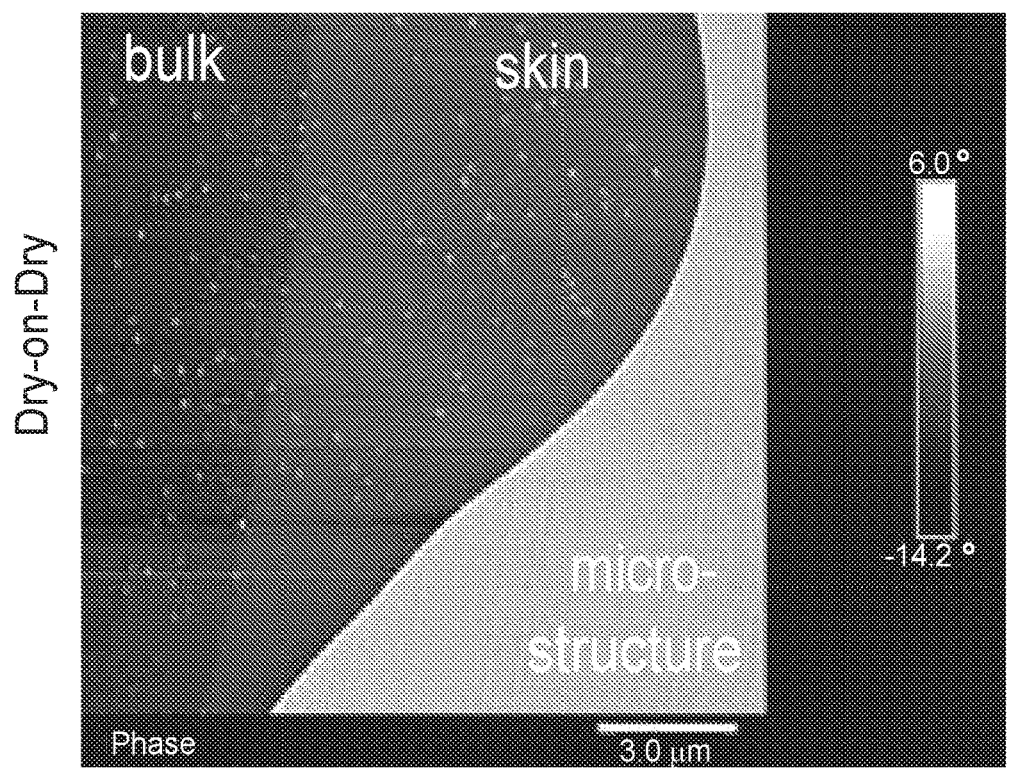
FIG. 5A is an AFM image for Comparative Example C2.

Similar to Example C1, AFM analysis showed the sharp interface between the bulk and skin adhesive layers, as represented in FIG. 5A. Also consistent with the dry-lamination method of Example C1, the skin layer appeared in excess near the corner of the micro-structure features on Web Material B, resulting in significant local thickness variations of the skin layer along the topography of the web surface.

It was determined that micro-structure features imparted in the dual-layer adhesive by Web Material B often buckled or collapsed when the web material was removed during sample preparation for AFM analysis. Although detrimental to the fidelity of the micro-structure shape shown in FIG. 5A, the failure did not interfere with analysis regarding excessive skin layer accumulation near the corner region. The micro-structure feature fidelity was much improved in cases where the skin layer was substantially conformal for the same materials and sample preparation method (see Example E2). Therefore, it was concluded that conformability of the skin layer helped to stabilize the micro-structured features in absence of the supporting web material.

Example E1

This example describes a dual-layer adhesive construction with bulk layer and skin layer coated on micro-structured web surface using a wet-on-wet coating method applied on a coating system similar to the coating apparatus 100 of FIG. 1. Adhesive coating Formulation A was deposited as the skin layer of 21 micrometers wet thickness onto micro-structured Web Material A at 0.51 meters per second using a slot die coating method applied to the free-span web path. Following skin layer coating, the web was conveyed a distance of approximately 1.5 meters (see L in FIG. 1) to the bulk layer coating applicator, resulting in about 3 seconds of residence time between coating steps. A slot die with backup roller was used at the bulk layer coating applicator to apply adhesive Formulation C on top of the skin layer at a wet thickness of 100 micrometers. The coated web was then conveyed into a four zone convection drying oven with a temperature profile of 120/140/180/200° F. for approximately 19 seconds of drying time in each oven zone and then collected as a sample of solidified dual-layer adhesive (bulk layer and skin layer) on Web Material A.

Figure 4B:
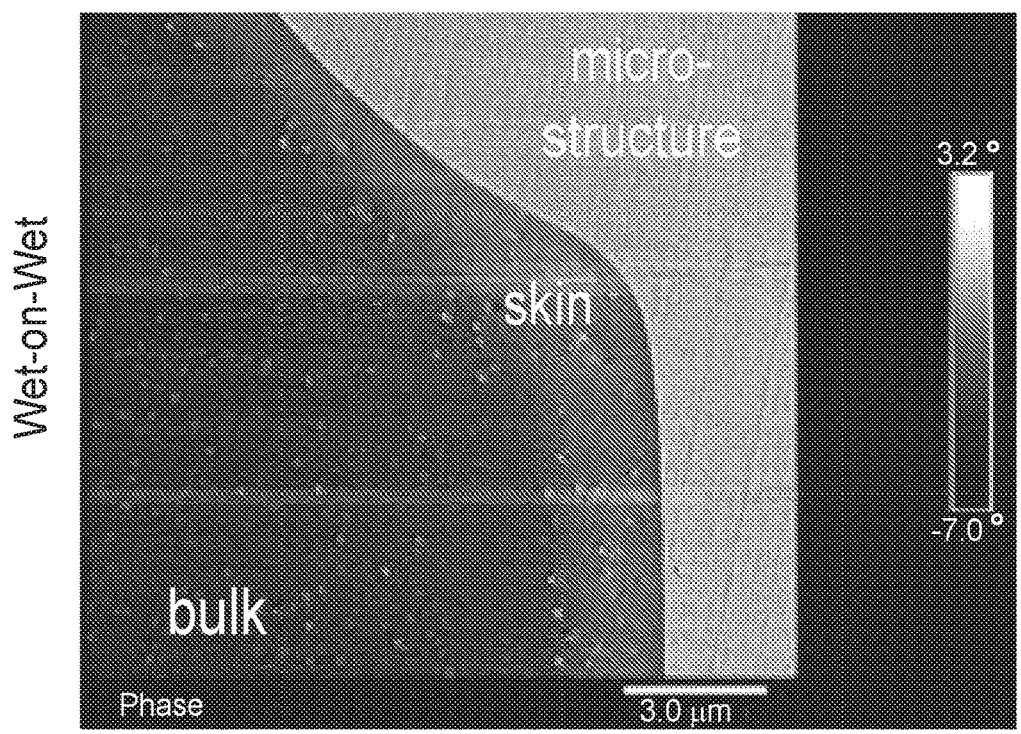
FIG. 4B is an AFM image for Example E1.

Solidified samples were cross-sectioned and AFM analysis used (methods described in the preceding text) for coating characterization with sub-micrometers resolution of the dual-layer construction, demonstrating the sharp interface between the bulk and skin adhesive layers as shown in FIG. 4B. Although AFM imaging provides clear contrast for the bulk layer and skin layer domains, there no longer appears to be the sharp interface between the adhesive layers that can be observed in FIG. 4A of Example C1. Instead, the wet-on-wet coating method featured in this example yielded a diffuse interface characteristic shown by the gradual transition between skin layer and bulk layer in FIG. 4B, signifying a blending of adhesive polymers within this transition region.

AFM analysis revealed a skin layer that is highly conformal to the micro-structure topography of Web Material A.

For instance, local thickness of the skin layer near the corner of the micro-structure web was within 20% of the expected dry thickness (2.1 micrometers) for a coating of the same wet coating thickness and solids content on an idealized web with planar surface. This property of the dual-layer construction provided stark contrast with Example C1 where skin layer coating accumulated in excess near the corner region.

Example E2

This example describes a dual-layer adhesive constructed on micro-structured web surface using the wet-on-wet coating method in Example E1. In this case, Web Material B was used as the substrate for the skin layer deposition of Formulation A and subsequent bulk layer coating of Formulation C. A web speed of 0.13 meters per second was used in this example, resulting in about 3 seconds of residence time as the web was conveyed a distance of approximately 1.5 meters (see L in FIG. 1) between coating steps. Coating thickness and drying conditions were controlled to be equivalent to Example E1.

Figure 5B:
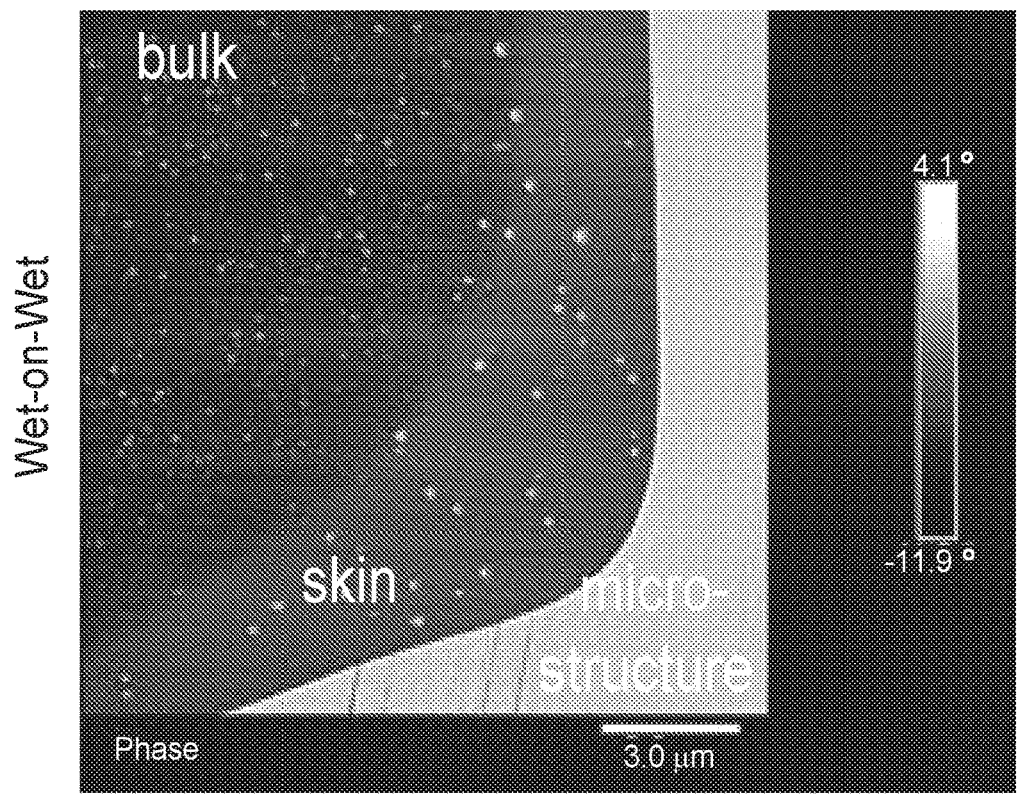
FIG. 5B is an AFM image for Example E2.

Similar to Example E1, AFM imaging shown in FIG. 5B reveals a substantially conformal skin layer along the micro-structure topography of Web Material B, contrasting with the excessive skin layer accumulation found in the comparative case Example C2 (see FIG. 4B). Furthermore, AFM sample preparation did not yield failure modes related to micro-structure buckling or collapse, which had been prevalent for the less conformal dual-layer adhesive sample made in Example C2. Therefore, micro-structure feature stability and fidelity was much improved in this case where the skin layer was made to be substantially conformal through process controls of the wet-on-wet coating method.

Residence Time

Examples E3

Examples E3A-C describe dual-layer adhesive constructions made using wet-on-wet coating method described in Example E1 with different residence times between skin layer and bulk layer coating applicators. In these examples, the length of web path between coating steps was fixed at approximately 1.5 meters (see L in FIG. 1) and web speed was controlled to achieve different desired values of residence time. Coating thicknesses and drying conditions were set to be the same for each case. Formulation A was deposited as the skin layer of 21 micrometers wet thickness onto micro-structured Web Material A and Formulation B was subsequently coated as the bulk layer at a wet thickness of 100 micrometers. The fluid coated web was conveyed into a four zone convection drying oven with a temperature profile of 120/140/180/200° F. for approximately 19 seconds of drying time in each oven zone.

Table 3 lists web speed and corresponding residence time values for Example 3A-C. In addition, the table summarizes corresponding AFM images for each example using a measurement of skin layer thickness near the micro-structure feature raised surface and adjacent corner region.

Table 3 also introduces a skin layer conformability index, $R_t$, which is defined by the ratio of skin layer dry thickness along the feature raised surface relative to the adjacent corner region skin layer thickness. The skin layer may be expected to be locally thinner at the feature raised surface relative to the adjacent corner region if initially the skin layer was substantially flat in the wet dual-layer coating (prior to drying), as illustrated in FIG. 2A. In this scenario, less coating fluid volume resides above the micro-structure raised surface relative to the adjacent regions, resulting in thinner skin layer along the feature raised surface upon drying and solidification of the coating. A mass balance for the skin layer coating can be used to approximate the ratio $R_t$ of skin layer dry thickness along the feature raised surface relative to the adjacent corner region, assuming there is no flow redistribution during drying and fluid and solid densities are approximately equivalent. In other words, the computed $R_t$ value (expressed by Equation 1 below) represents the maximum skin layer conformability index allowed for a given skin layer wet thickness on a specified micro-structured web assuming initially flat wet coating profile.

$$R_t = \frac{t_w + h(A-1)}{t_w + Ah} \quad \text{(Equation 1)}$$

In Equation 1, h is the micro-structure feature height, A is the fractional area coverage of micro-structure raised features on the web surface (corresponding to the ratio of 242 to 241 shown in FIG. 2B), and $t_w$, is the theoretical wet thickness if the coating was applied to a planar surface (corresponding to 531 in FIG. 12A). Table 3 lists calculated $R_t$ values (using Equation 1) alongside with measured $R_t$ values in for Example 3A-C.

TABLE 3

Properties corresponding to Examples 3A-C

| Example | Web Speed (meters per second) | Residence Time, T (seconds) | Raised surface Skin Layer Thickness (micrometers) | Corner Skin Layer Thickness (micrometers) | $R_t$ (measured) | $R_t$ (theory) |
|---|---|---|---|---|---|---|
| 3A | 100 | 3 | 1.3 | 2.5 | 0.52 | 0.44 |
| 3B | 50 | 6 | 1.0 | 2.9 | 0.34 | 0.44 |
| 3C | 25 | 12 | 0 | 3.3 | 0 | 0.44 |

Figure 9:
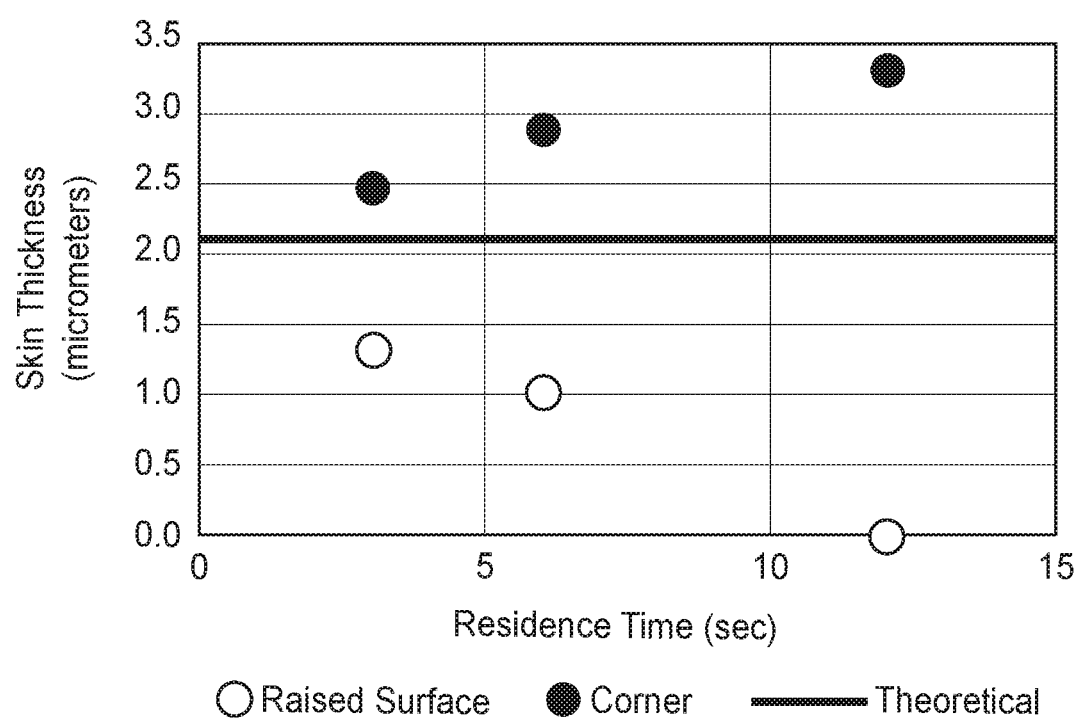
FIG. 9 is plots of skin coating layer dry thickness versus residence time.

Data for skin layer thickness are plotted in FIG. 9 to illustrate the trend of skin layer depletion from the feature raised surface and accumulation near the corner as residence time increases. FIG. 9 also includes a curve labeled "theoretical" which denotes the expected dry thickness of the skin layer if it were coated on a planar surface. The sections below contain more detailed description of the dual-layer adhesive made from wet-on-wet coating conditions in Example E3A-C.

Example E3A

Figure 6A:
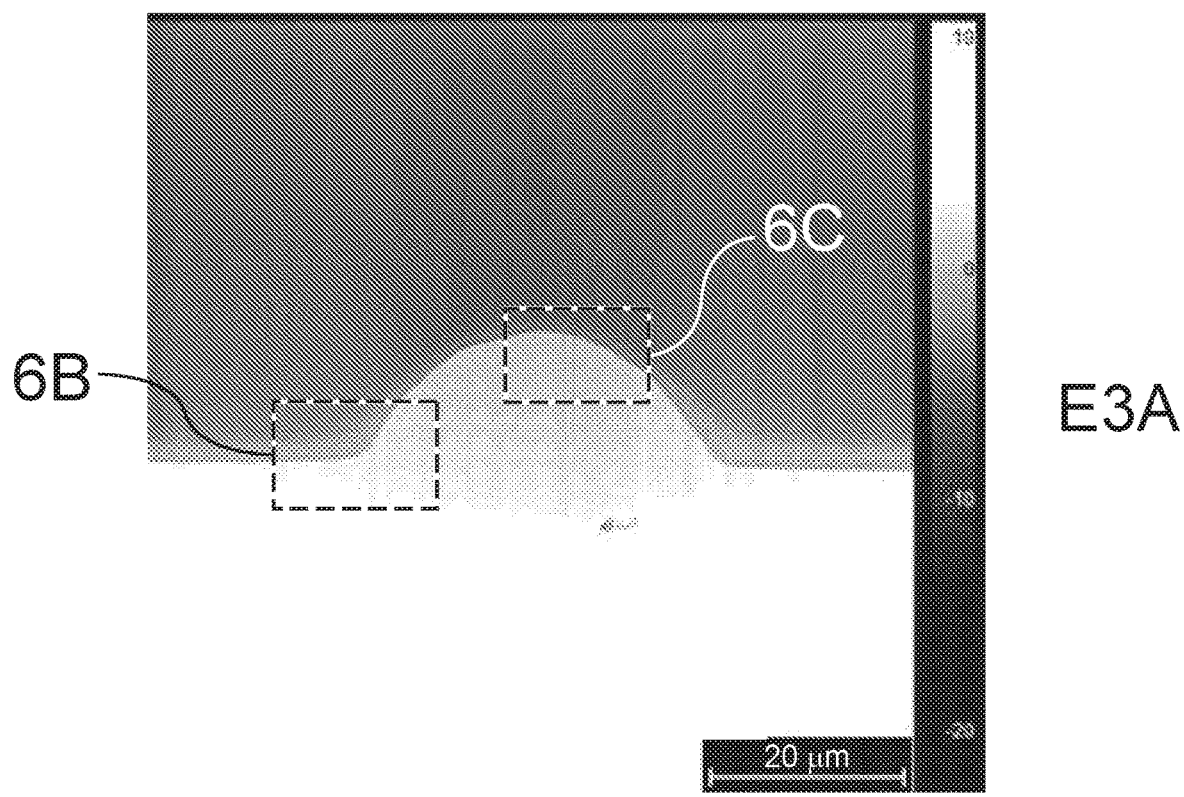
FIG. 6A is an AFM image of Example E3A.

Example E3A is the same as Example E1. AFM analysis was used to characterize the dual-layer adhesive over an entire feature area (FIG. 6A), as well as enlarged views near the corner region (FIG. 6B) and raised surface (FIG. 6C). The broad view in FIG. 6A confirms that the conditions of Example E3A produced a continuous skin layer that substantially conformally covers the micro-structure feature on the surface of Web Material A.

Figure 6B:
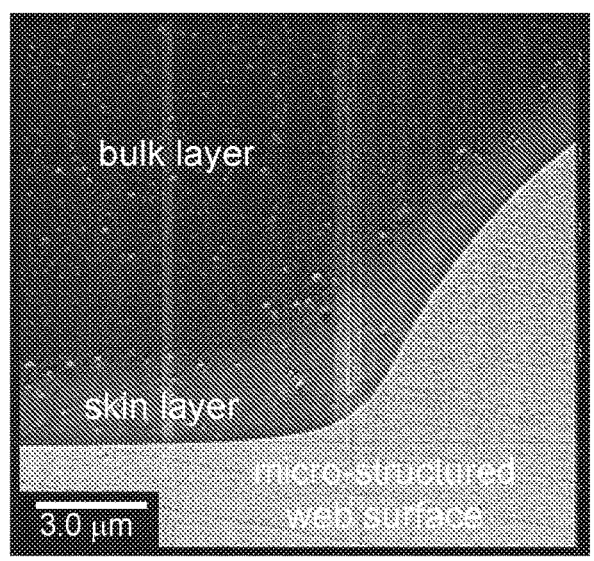
FIG. 6B is an enlarged portion view of the image of FIG. 5A.
Figure 6C:
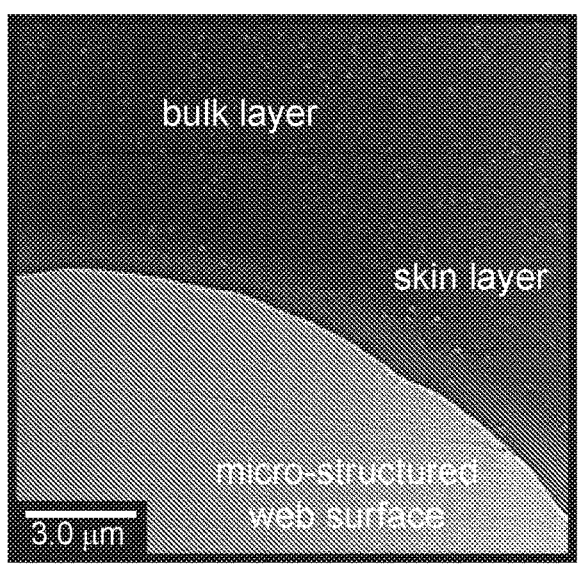
FIG. 6C is an enlarged portion view of the image of FIG. 5A.

The enlarged views shown in images FIG. 6B and FIG. 6C reveal the skin layer is locally thinner at the feature raised surface relative to the adjacent corner region, which would be expected if initially the skin layer was substantially flat in the wet dual-layer coating (prior to drying), as illustrated in FIG. 2A. As described in the text above, Equation 1 describes the theoretical conformability index $R_t$ as the ratio of skin layer dry thickness along the feature raised surface relative to the adjacent corner region. Inserting values corresponding to this Example (h=13 micrometers, A=0.2, and $t_w$=2.1 micrometers) predicts a $R_t$ value of 0.44. The $R_t$ value of 0.52 based on measurements of coating thickness (from FIG. 6B and FIG. 6C) is reasonably close to prediction considering the assumptions of the relatively simple theoretical model. The agreement between theory and measurement demonstrates that the process conditions used in Example E3A approximately achieved the maximum conformability index.

Example E3B

Figure 7A:
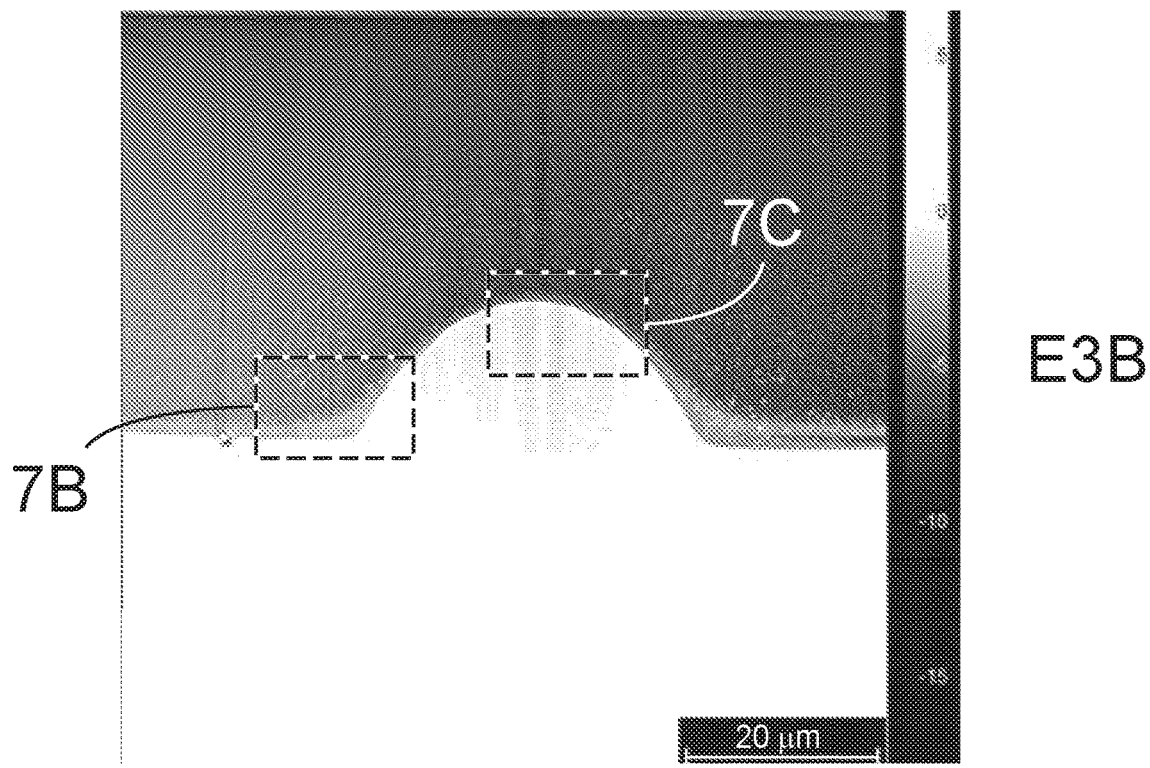
FIG. 7A is an AFM image of Example E3B.
Figures 7B, 7C:
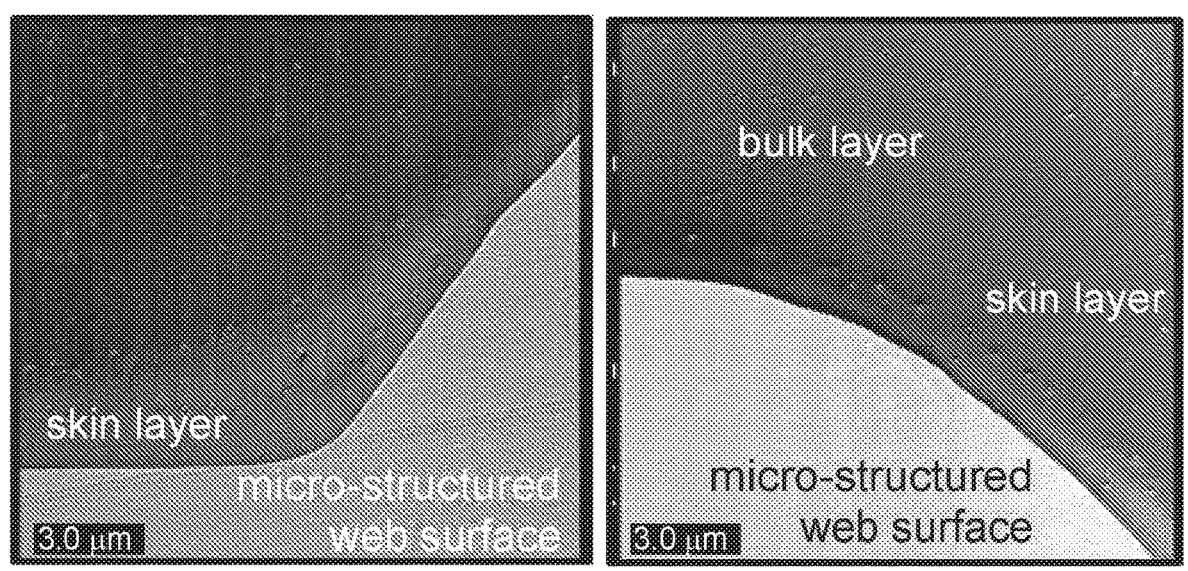
FIG. 7B is an enlarged portion view of the image of FIG. 6A.
FIG. 7C is an enlarged portion view of the image of FIG. 6A.

AFM analysis was used to characterize the dual-layer adhesive over an entire feature area (FIG. 7A), as well as enlarged images near the corner region (FIG. 7B) and raised surface (FIG. 7C). The broad view in FIG. 7A confirms that the conditions of this Example produced a continuous skin layer that covers the micro-structure feature on the surface of Web Material A, although it does not have the same conformal properties of Example E3A. Enlarged images (FIG. 7B and FIG. 7C) reveal the skin layer has thinned at the feature raised surface and accumulated more skin layer material near the adjacent corner region. A $R_t$ value of 0.34 was obtained from measurements, signifying less conformability of the skin layer than the case in Example E3A. This result suggests that some flow redistribution of skin layer occurred during the longer residence time between the first and second coating steps in this Example (6 seconds residence time) relative to Example E3A (3 seconds residence time).

Example E3C

Figure 8A:
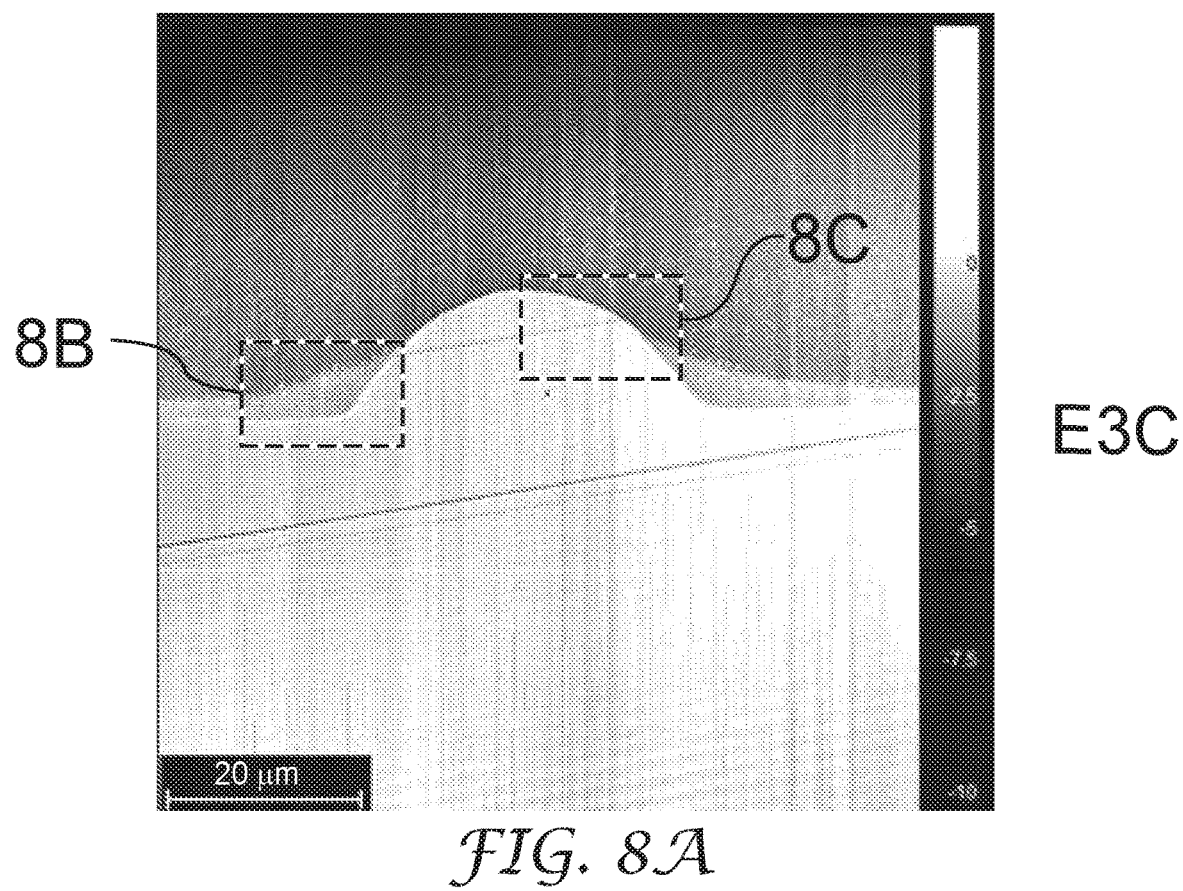
FIG. 8A is an AFM image of Example E3C.
Figure 8B:
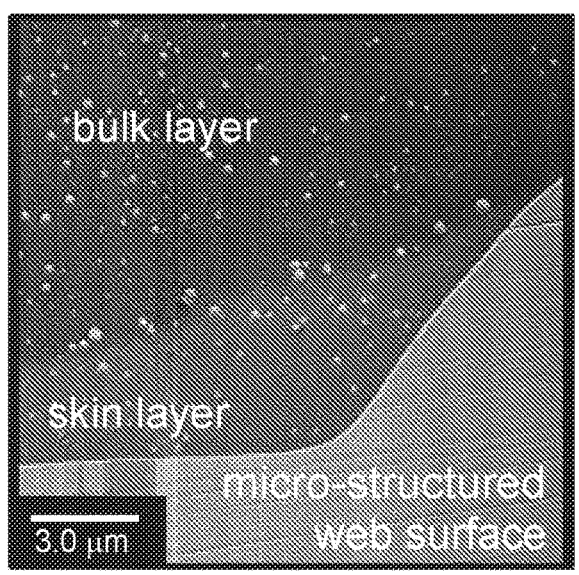
FIG. 8B is an enlarged portion view of the image of FIG. 7A.
Figure 8C:
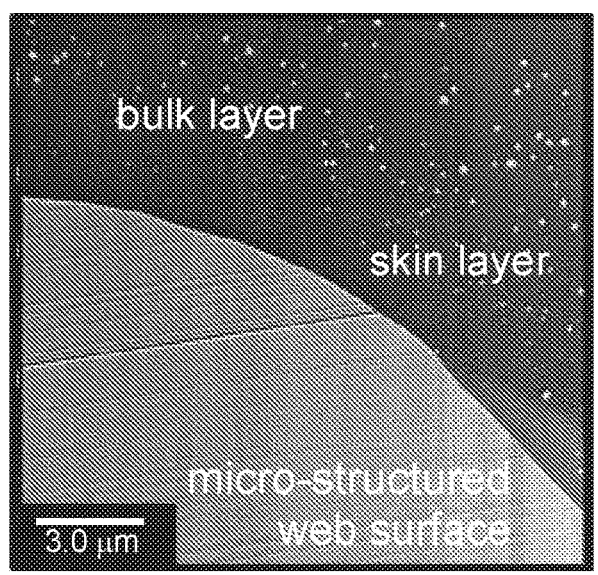
FIG. 8C is an enlarged portion view of the image of FIG. 7A.

AFM analysis was used to characterize the dual-layer adhesive over an entire feature area (FIG. 8A), as well as enlarged images near the corner region (FIG. 8B) and raised surface (FIG. 8C). The broad view in FIG. 8A shows that the conditions of this Example produced a discontinuous skin layer that does not completely cover the micro-structure feature on the surface of Web Material A. Enlarged images (FIG. 8B and FIG. 8C) reveal the skin layer does not extend to the feature raised surface and instead has accumulated in the adjacent corner region to a more significant extent than Example E3B. In this case, a $R_t$ value of 0 reflects the discontinuous nature of the skin layer being absent (zero thickness) at the raised surface of the micro-structured feature. Consequently, the skin layer does not conformally follow the micro-structure surface due to the longer residence time between the first and second coating steps in this Example (12 seconds residence time) relative to Example E3B (6 seconds residence time).

Diffuse Interface

Example E4A

This example describes a dual-layer adhesive construction with bulk layer and skin layer coated on micro-structured web surface using a wet-on-wet coating method applied during a single pass on a coating system similar to the coating apparatus 100 of FIG. 1. Adhesive coating Formulation B was deposited as the skin layer of 21 micrometers wet thickness onto micro-structured Web Material B at 0.15 meters per second using a Mayer rod coating method applied to the free-span web path. Following skin layer coating, the web was conveyed a distance of approximately 0.9 meters (see L in FIG. 1) to the bulk layer coating applicator, resulting in about 6 seconds of residence time between coating steps. A slot die with backup roller was used at the bulk layer coating applicator to apply adhesive Formulation D on top of the skin layer at a wet thickness of 84 micrometers. The coated web was then conveyed into a four zone convection drying oven with a temperature profile of 120/140/180/200° F. for approximately 24 seconds of drying time in each oven zone and then collected as a sample of solidified dual-layer adhesive (bulk layer and skin layer) on Web Material B.

Figure 10A:
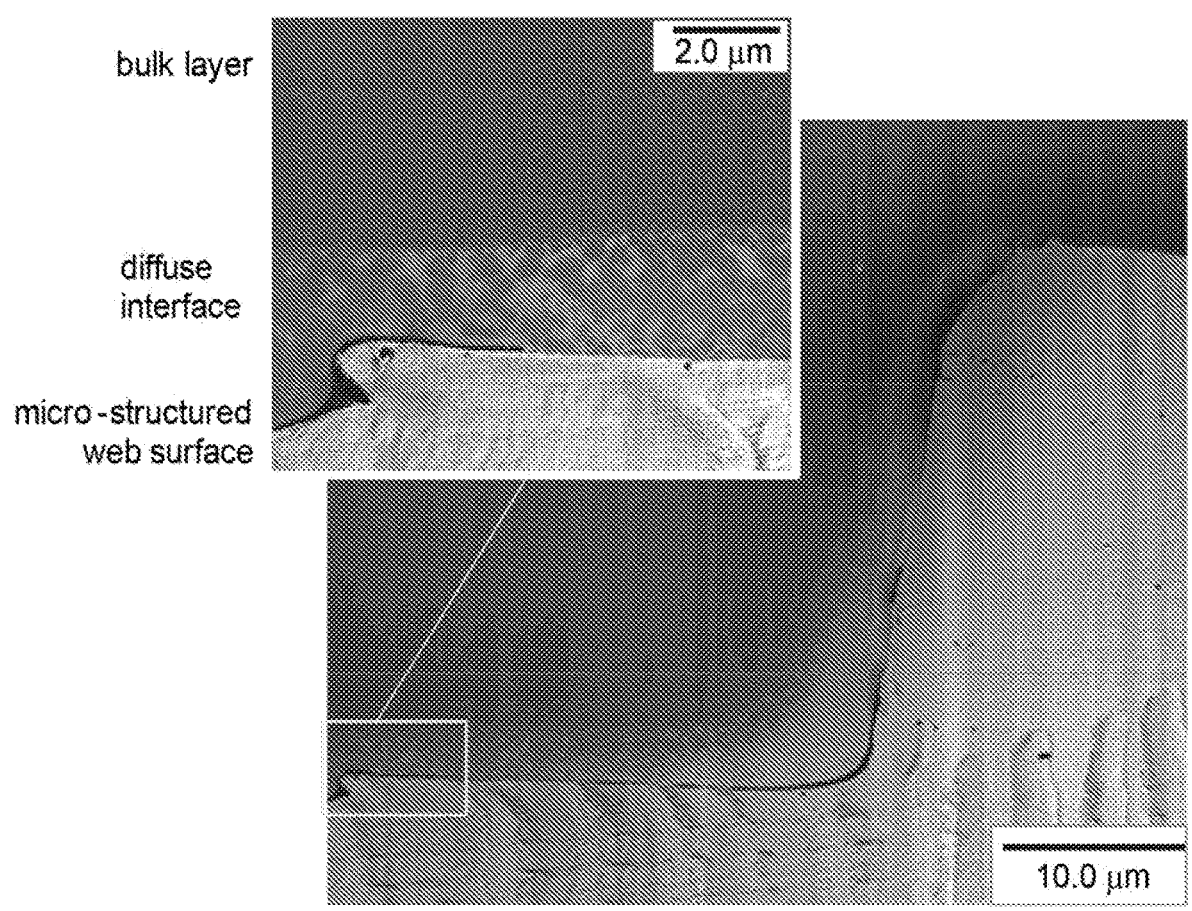
FIG. 10A is an AFM image of Example E5A.

AFM analysis similar to Example E1 was used for sample characterization with sub-micrometers resolution of the dual-layer construction, as shown in FIG. 10A. The AFM image shown in FIG. 10A provides clear contrast between the bulk layer and skin layer domains but does not appear to have properties of the sharp interface between the adhesive layers that was observed in Example C1 (see FIG. 4A), nor the smooth diffuse interface transition obtained from conditions in Example E1 (see FIG. 4B). Instead, this Example produced a complex adhesive morphology at the diffuse interface with polymer from the bulk layer appearing as sub-micron domains encapsulated within the skin layer adhesive. The diffuse interface, having a thickness of 1 micrometer to 2 micrometers, follows along the topography of the micro-structured web. Near the corner region the skin layer is substantially thicker, yielding a clear transition from bulk layer to diffuse interface (encapsulated bulk layer polymer) to primarily skin layer adjacent to the micro-structured web.

Example E4B

This example describes a dual-layer adhesive constructed on micro-structured web surface using the wet-on-wet coating method in Example E4A. In this case, Web Material B was used as the substrate for the skin layer deposition of Formulation B at wet thickness of 56 micrometers. The subsequent bulk layer coating of Formulation D was deposited at a wet thickness of 74 micrometers on top of the fluid skin layer. Web speed, residence time between coating applicators, and drying conditions were controlled to be equivalent to Example E4A.

Figure 10B:
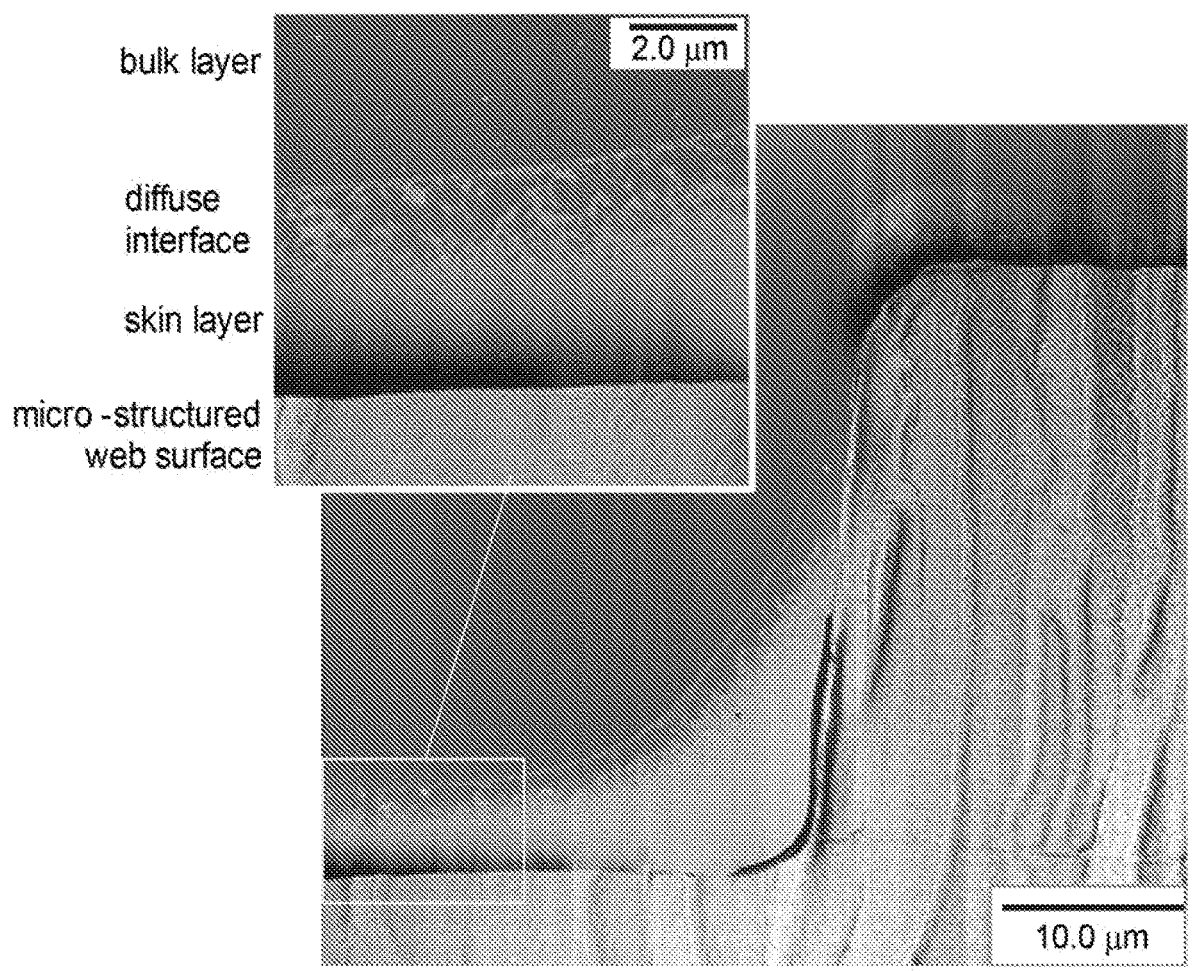
FIG. 10B is an AFM image of Example E5B.

AFM analysis was used for sample characterization with sub-micrometers resolution of the dual-layer construction, as shown in FIG. 10B. Similar to Example 4A, the AFM image in FIG. 10B shows a complex adhesive morphology at the diffuse interface with polymer from the bulk layer appearing as sub-micron domains encapsulated within the skin layer adhesive. The diffuse interface, having a thickness of 1 micrometer to 2 micrometers, follows along the topography of the micro-structured web. The skin layer of this Example is substantially thicker than that of Example 4A, yielding a more distinct transition from the diffuse interface (encapsulated bulk layer polymer) to primarily skin layer near the base of the micro-structured features.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method comprising:
   moving, along a web path, a substrate from a first coating applicator to a second coating applicator, the substrate comprising a structured surface including a pattern of structured features;
   applying a first coating fluid from the first coating applicator on to the structured surface of the substrate to form a first coating layer directly over the pattern of structured features, wherein the first coating fluid comprises a first polymer having a Fox Tg of −20 to 50° C.;
   applying a second coating fluid from the second coating applicator on to the first coating layer to form a second coating layer directly over the first coating layer, the second coating fluid being different from the first coating fluid, wherein the second coating fluid comprises a second polymer having a Fox Tg of up to −30° C.; and
   solidifying the first and second coating layers to form a dual-layer coating comprising a skin layer and a bulk layer, wherein a residence time between applying the first coating fluid and applying the second coating fluid is controlled to achieve a diffuse interface having a thickness of 0.2 to 5.0 micrometers between the skin layer and the bulk layer, the diffuse interface comprising sub-micron domains of the second polymer encapsulated within the first polymer.

2. The method of claim 1, wherein the second coating fluid has a higher viscosity than the first coating fluid.

3. The method of claim 2, wherein the first coating fluid has a viscosity in the range from about 0.5 cP to about 300 cP at a shear rate of 100 1/s.

4. The method of claim 2, wherein the viscosity ratio at a shear rate of 100 1/s between the first and second coating fluid is in the range from about 0.001 to about 0.5.

5. The method of claim 1, wherein the ratio of the first coating layer average wet thickness and the bulk layer average wet thickness is in a range from about 0.01 to about 1.0.

6. The method of claim 1, wherein the ratio of the skin layer average dry thickness and the bulk layer average dry thickness is in a range from about 0.01 to about 0.3.

7. The method of claim 1, wherein the structure features have a characteristic height or depth of about 2 to about 100 micrometers.

8. The method of claim 1, wherein at least one of the first and second coating fluids comprises one or more particle-laden fluids.

9. A multilayer coated article comprising:
   a substrate comprising a first major surface and a second opposing major surface, the first major surface comprising a micro-structured surface comprising a pattern of structured features including one or more rising walls each extending from a raised end to a lower end opposite the raised end, each rising wall connecting a raised surface at the raised end and a corner at the lower end; and
   a dual-layer coating disposed on the micro-structured surface of the substrate,
   wherein the dual-layer coating comprises:
      a skin layer comprising a first polymer having Fox Tg of −20 to 50° C. directly disposed on the micro-structured surface of the substrate, wherein the skin layer has a thickness on the corners greater than on the raised surfaces;
      a bulk layer comprising a second polymer having a Fox Tg of up to −30° C. directly disposed upon the skin layer; and
      a diffuse interface having a thickness of 0.2 to 5.0 micrometers between the skin layer and the bulk layer, the diffuse interface comprising sub-micron domains of the second polymer encapsulated within the first polymer.

10. The article of claim 9, wherein the skin layer is a continuous layer substantially covering the micro-structured surface.

11. The article of claim 9, wherein the skin layer is a discontinuous layer separated by the raised surfaces.

12. The article of claim 9, wherein the ratio of the skin layer average dry thickness and the bulk layer average dry thickness is in a range from about 0.01 to about 0.3.

13. The article of claim 9, wherein the dual-layer coating comprises one or more particle-laden layers.

* * * * *